US008820997B2

(12) United States Patent
Minami

(10) Patent No.: US 8,820,997 B2
(45) Date of Patent: Sep. 2, 2014

(54) LIGHT SOURCE DEVICE AND DISPLAY

(75) Inventor: Masaru Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 13/435,374

(22) Filed: Mar. 30, 2012

(65) Prior Publication Data

US 2012/0257406 A1    Oct. 11, 2012

(30) Foreign Application Priority Data

Apr. 6, 2011    (JP) .................................. 2011-084732

(51) Int. Cl.

| | | |
|---|---|---|
| *G02B 6/10* | (2006.01) | |
| *G02F 1/13357* | (2006.01) | |
| *H04N 13/04* | (2006.01) | |
| *G03B 35/24* | (2006.01) | |
| *G03B 25/02* | (2006.01) | |
| *G02B 27/22* | (2006.01) | |
| *G02F 1/1335* | (2006.01) | |

(52) U.S. Cl.
CPC .......... *G02B 27/2214* (2013.01); *G02B 6/0043* (2013.01); *H04N 13/0418* (2013.01); *G02B 6/0068* (2013.01); *G02F 1/133615* (2013.01); *G03B 35/24* (2013.01); *G02B 6/0058* (2013.01); *G02B 6/0036* (2013.01); *G03B 25/02* (2013.01); *H04N 13/0454* (2013.01); *G02F 1/133602* (2013.01); *H04N 13/0411* (2013.01)
USPC .......................................... 362/602; 362/613

(58) Field of Classification Search
CPC ............................ G02B 6/0016; F21V 7/0091
USPC .......... 362/602, 613, 626, 97.2, 97.3
See application file for complete search history.

(56) References Cited

U.S. PATENT DOCUMENTS

| | | | |
|---|---|---|---|
| 4,673,254 | A | 6/1987 | Kato et al. |
| 5,575,549 | A | 11/1996 | Ishikawa et al. |
| 5,831,765 | A | 11/1998 | Nakayama et al. |
| 5,897,184 | A | 4/1999 | Eichenlaub et al. |
| 5,956,107 | A | 9/1999 | Hashimoto et al. |
| 5,991,073 | A | 11/1999 | Woodgate et al. |
| 6,144,424 | A | 11/2000 | Okuda et al. |
| 6,447,132 | B1 | 9/2002 | Harter, Jr. |

(Continued)

FOREIGN PATENT DOCUMENTS

| | | |
|---|---|---|
| JP | 62-029003 A | 7/1987 |
| JP | 01-241590 A | 9/1989 |

(Continued)

*Primary Examiner* — David V Bruce
(74) *Attorney, Agent, or Firm* — Wolf, Greenfield & Sacks, P.C.

(57) ABSTRACT

A light source device includes: a light guide plate having a first internal reflection face and a second internal reflection face, and having one or more side faces; one or more first light sources applying first illumination light into the light guide plate; and a second light source disposed to face a surface, of the light guide plate, corresponding to the second internal reflection face, the second light source externally applying second illumination light to the second internal reflection face. One or both of the first and second internal reflection faces each have scattering regions allowing the first illumination light from the first light source to be scattered and to exit from the first internal reflection face to outside the light guide plate, each of the scattering regions being provided with one or more pass-through regions each allowing the second illumination light from the second light source to pass therethrough.

11 Claims, 19 Drawing Sheets

(56) References Cited

U.S. PATENT DOCUMENTS

| | | |
|---|---|---|
| 7,356,211 B2 | 4/2008 | Sugiura et al. |
| 7,507,011 B2 | 3/2009 | Ueno et al. |
| 7,525,531 B2 | 4/2009 | Ogiwara et al. |
| 7,876,397 B2 | 1/2011 | Krijn et al. |
| 7,920,226 B2 | 4/2011 | Mather et al. |
| 8,033,706 B1 | 10/2011 | Kelly et al. |
| 2006/0056791 A1 | 3/2006 | Tzschoppe |
| 2008/0204550 A1 | 8/2008 | De Zwart et al. |
| 2010/0091354 A1 | 4/2010 | Nam et al. |
| 2010/0110340 A1 | 5/2010 | Mather et al. |
| 2010/0157200 A1 | 6/2010 | Mun et al. |
| 2011/0205448 A1 | 8/2011 | Takata |
| 2011/0242441 A1 | 10/2011 | Minami |
| 2011/0317261 A1 | 12/2011 | Minami et al. |
| 2012/0014136 A1 | 1/2012 | Lee et al. |
| 2012/0075698 A1 | 3/2012 | Minami |
| 2012/0105767 A1 | 5/2012 | Choi et al. |
| 2012/0195072 A1 | 8/2012 | Minami |
| 2012/0256974 A1 | 10/2012 | Minami |
| 2012/0275183 A1 | 11/2012 | Minami |
| 2012/0306861 A1 | 12/2012 | Minami |
| 2013/0057537 A1 | 3/2013 | Hong et al. |
| 2013/0076999 A1 | 3/2013 | Minami |
| 2013/0083260 A1 | 4/2013 | Minami |
| 2013/0105767 A1 | 5/2013 | Lin et al. |
| 2013/0114292 A1* | 5/2013 | Brick et al. .......... 362/608 |

FOREIGN PATENT DOCUMENTS

| | | |
|---|---|---|
| JP | 03-011502 A | 1/1991 |
| JP | 10-097199 A | 4/1998 |
| JP | 10-508151 A | 4/1998 |
| JP | 3565391 B2 | 6/2004 |
| JP | 2004-240294 A | 8/2004 |
| JP | 2004-279815 A | 10/2004 |
| JP | 2007-507071 A | 3/2007 |
| JP | 2007-187823 A | 7/2007 |
| JP | 2007-242336 A | 9/2007 |
| JP | 2007-272994 A | 10/2007 |
| JP | 2007-279224 A | 10/2007 |
| JP | 2009-176593 A | 8/2009 |
| WO | WO 2010/024647 A2 | 3/2010 |

* cited by examiner

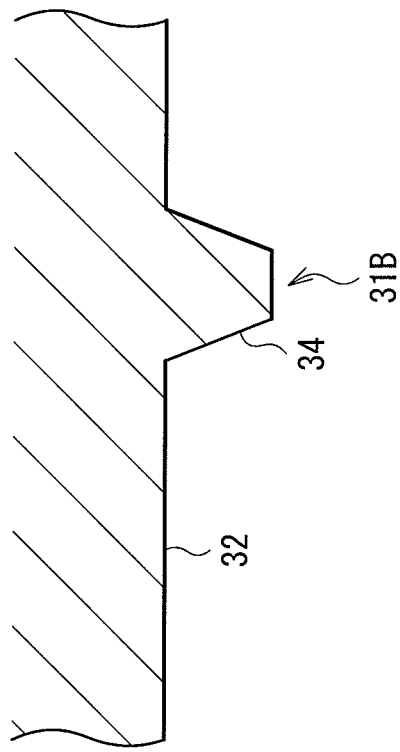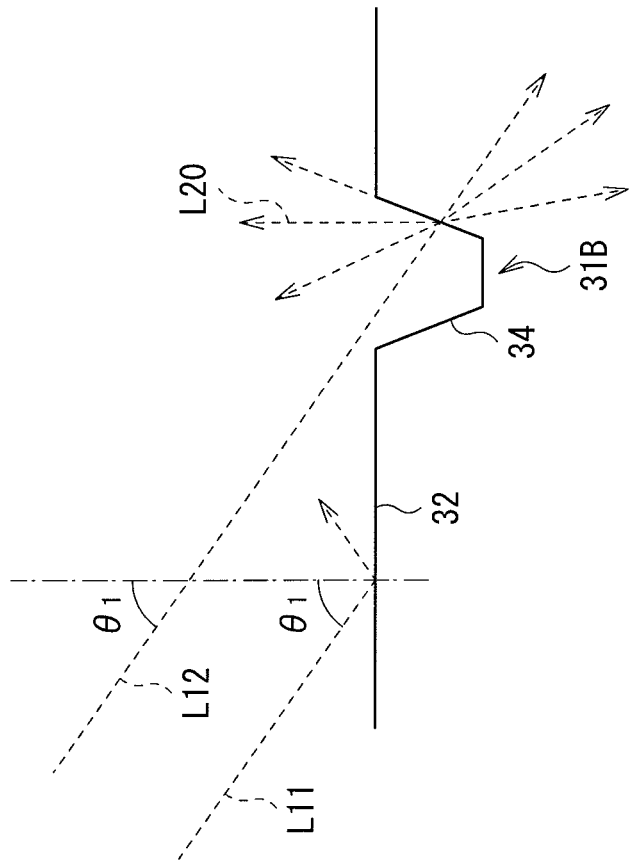
FIG. 6A
FIG. 6B

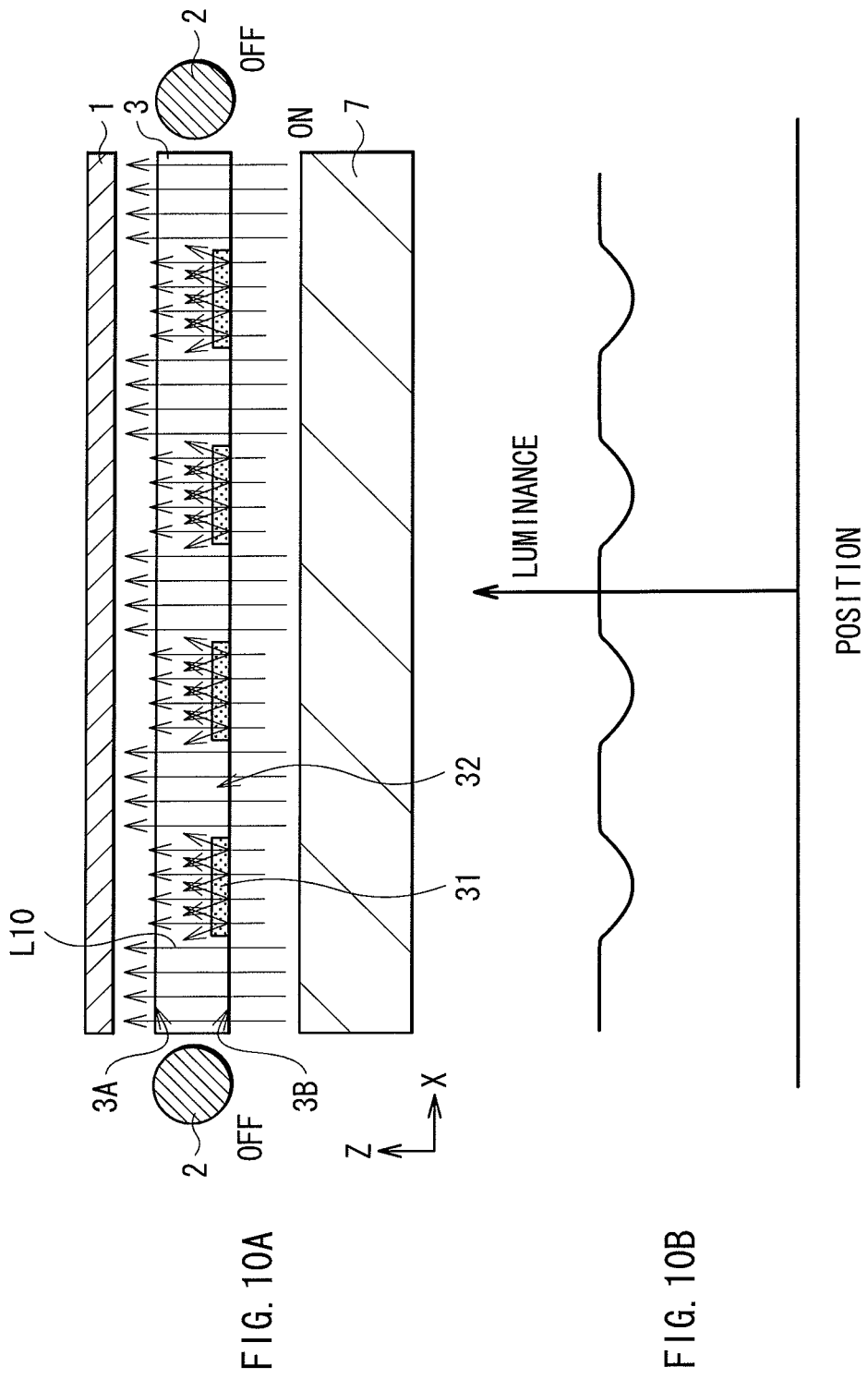

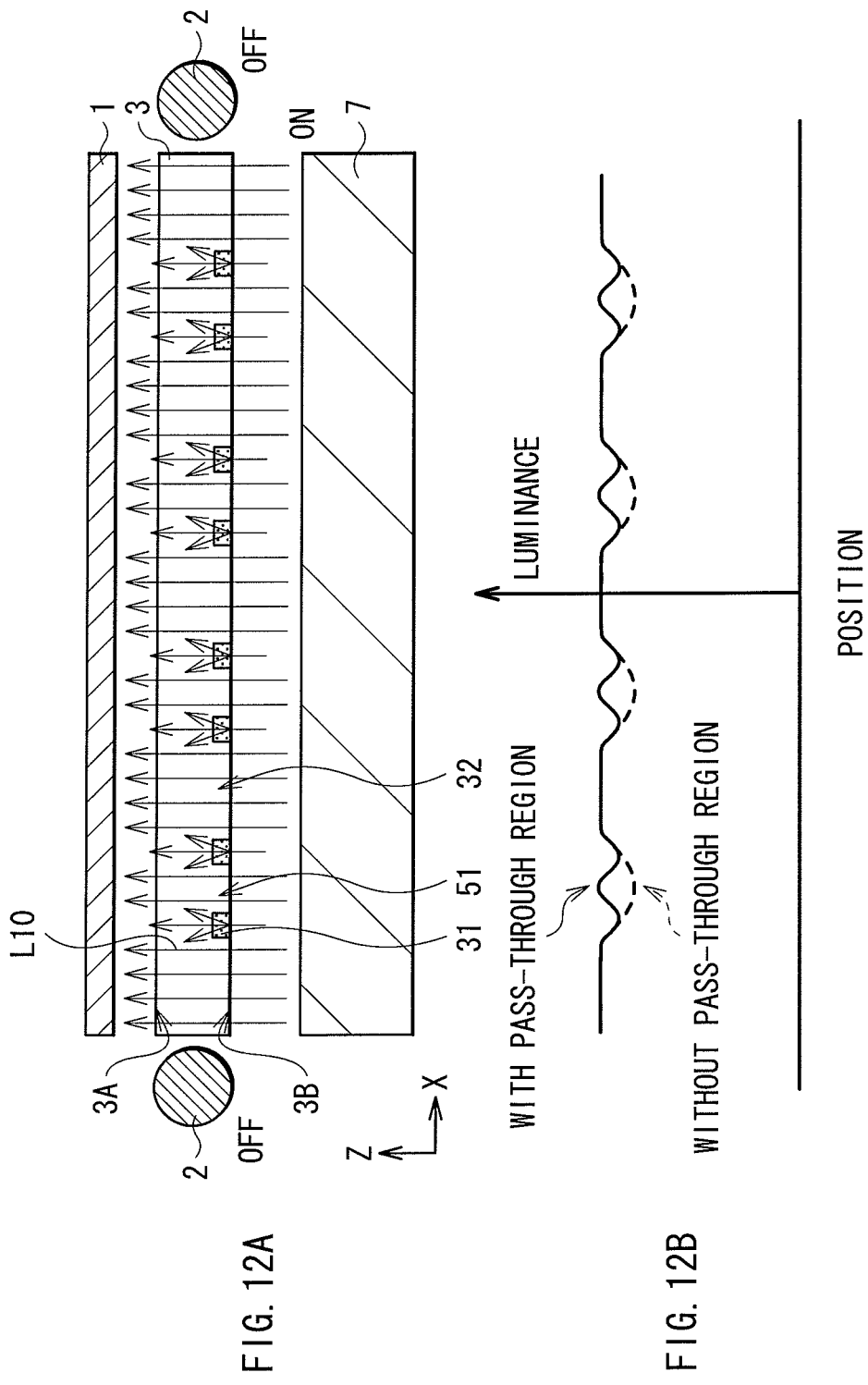

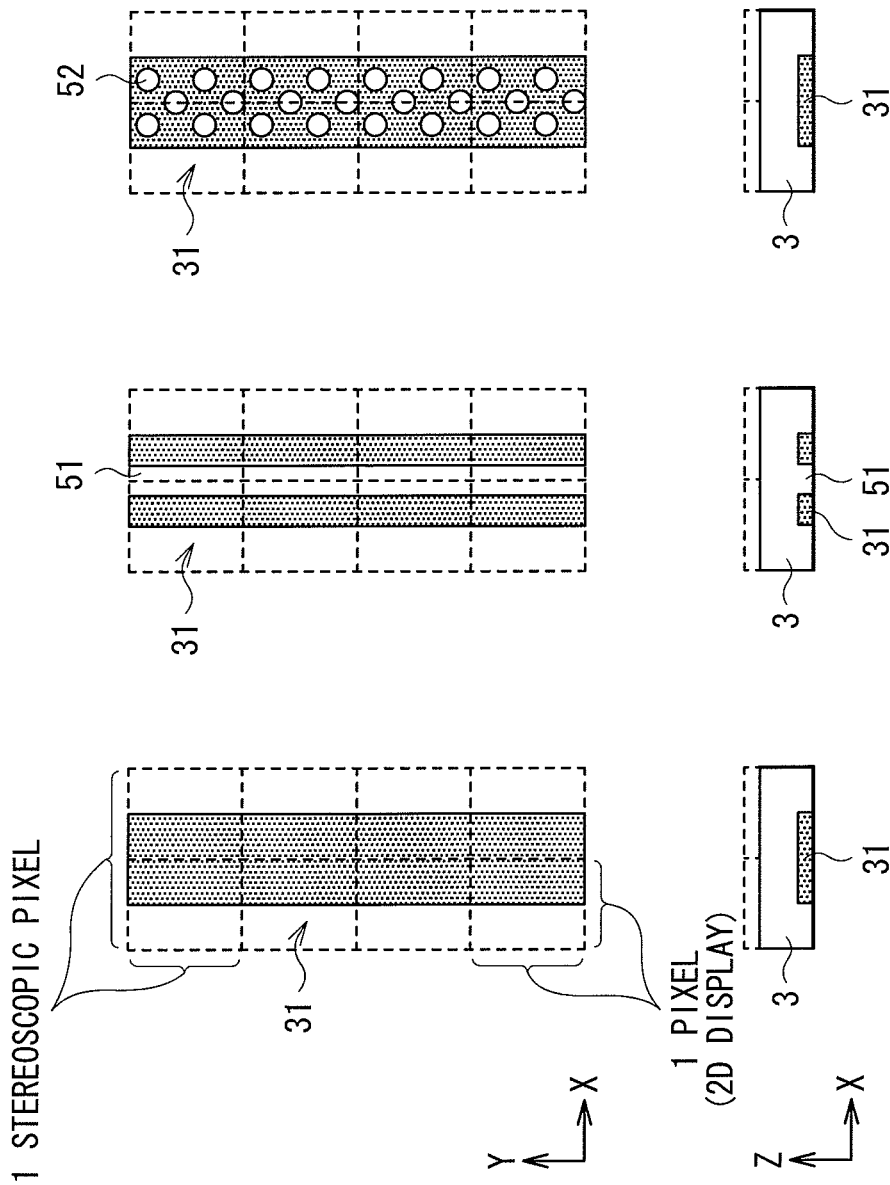

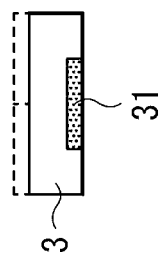
FIG. 16C
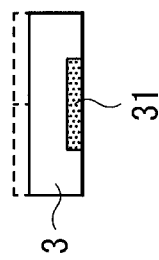
FIG. 16B
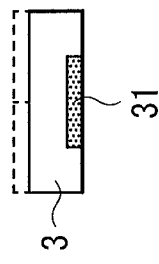
FIG. 16A
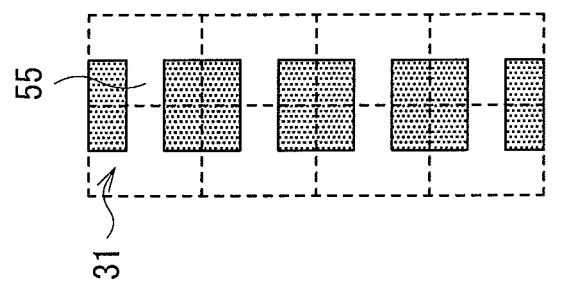
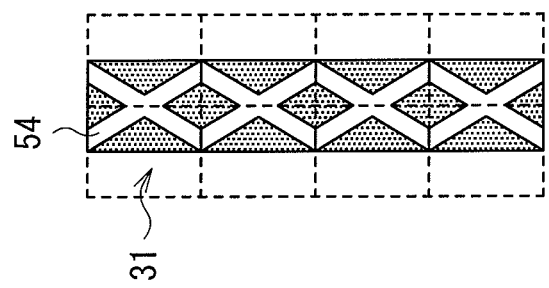
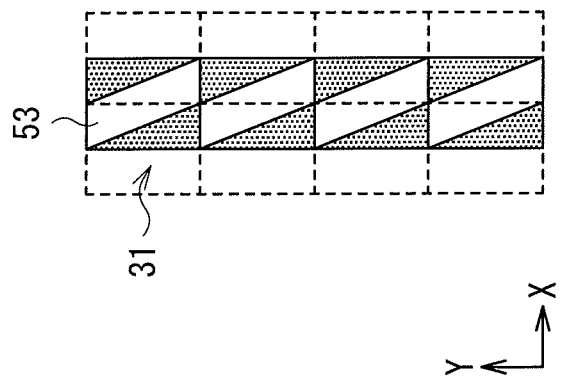

LIGHT SOURCE DEVICE AND DISPLAY

BACKGROUND

The present disclosure relates to a light source device and a display enabling stereoscopic viewing using the technology of parallax barrier.

SUMMARY

A stereoscopic display using the technology of parallax barrier is known to enable stereoscopic viewing directly through viewers' eyes without the need for them to wear any special glasses. This stereoscopic display includes a parallax barrier, which is opposed to the front surface of a two-dimensional (2D) display panel, i.e., the display surface side. The parallax barrier is generally configured to include a light shielding section and a stripe-shaped aperture section (slit section), which are alternately provided in the horizontal direction. The light shielding section is for shielding display image light coming from the 2D display panel, and the aperture section is for passing the display image light therethrough.

With the technology of parallax barrier, for stereoscopic viewing, a parallax image (for two perspectives, a right-eye perspective image and a left-eye perspective image) is spatially divided before display on the 2D display panel. The resulting perspective image is then subjected to parallax separation in the horizontal direction using the parallax barrier so that stereoscopic viewing is performed. In the parallax barrier, by appropriately setting the slit width or others, when a viewer at a predetermined position looks at the stereoscopic display from a predetermined direction, his or her right and left eyes are provided with different parallax image light via the slit section.

Herein, when the 2D display panel in use is a transmissive liquid crystal display panel, for example, the parallax barrier may be disposed on the rear surface side of the 2D display panel (for example, see FIG. 10 of Japanese Patent No. 3565391, and FIG. 3 of Japanese Unexamined Patent Application Publication No. 2007-187823). If this is the configuration, the parallax barrier is located between the transmissive liquid crystal display panel and a backlight.

With such a stereoscopic display using the technology of parallax barrier, however, the parallax barrier being a component specifically designed for three-dimensional (3D) display is in use. This thus causes a disadvantage of expecting a larger number of components for use, and a larger placement space for the display compared with a general display for 2D display.

It is thus desirable to provide a light source device and a display implementing, using a light guiding plate, the functions equivalent to those of a parallax barrier.

A light source device according to an embodiment of the present disclosure includes a light guide plate having a first internal reflection face and a second internal reflection face which face each other, and having one or more side faces; one or more first light sources applying first illumination light through the side faces of the light guide plate into the light guide plate; and a second light source disposed to face a surface, of the light guide plate, corresponding to the second internal reflection face, the second light source externally applying second illumination light to the second internal reflection face. One or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

A display according to an embodiment of the present disclosure includes a display section performing image display; and a light source device emitting light for image display toward the display section, the light source device including a light guide plate having a first internal reflection face and a second internal reflection face which face each other, and having one or more side faces; one or more first light sources applying first illumination light through the side faces of the light guide plate into the light guide plate; and a second light source disposed to face a surface, of the light guide plate, corresponding to the second internal reflection face, the second light source externally applying second illumination light to the second internal reflection face. One or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

A display according to another embodiment of the present disclosure includes a display section; and a light source device including a light guiding plate, one or more first light sources, and a second light source, the light guiding plate having a first face and a second face which face each other and having one or more side faces, the first light sources being disposed to face the respective side faces of the light guide plate, the second light source being disposed to face a surface, of the light guide plate, corresponding to the second face, the second light source being controlled to stay in a light-off state when the display section is in a 3D mode, and controlled to stay in a light-on state when the display section is in a 2D mode. One or both of the first and second faces each have a plurality of scattering regions, each of the scattering regions being provided with one or more pass-through regions each allowing light from the second light source to pass therethrough.

With the light source device or the display according to the embodiment of the present disclosure, the first illumination light coming from the first light source is scattered by the scattering regions, and the resulting light is partially or entirely emitted from the first internal reflection face to the outside of the light guiding plate. This accordingly provides the light guiding plate itself with the functions as a parallax barrier. In other words, the light guiding plate is allowed to function equivalently as a parallax barrier with the scattering regions serving as aperture sections (slit sections). Moreover, the second illumination light coming from the second light source passes through the pass-through region in each of the scattering regions.

With the light source device or the display according to the embodiment of the present disclosure, the first or second internal reflection face of the light guiding plate is provided with the scattering regions. This accordingly provides the light guiding plate itself with the functions equivalently as a parallax barrier. Furthermore, the scattering regions are each provided therein with the pass-through region to allow the second illumination light from the second light source to pass therethrough, thereby favorably preventing any possible reduction of the light use efficiency of the second light source.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 6A is a cross-sectional view of the light guiding plate in the display of FIG. 1, showing a second exemplary design of the surface thereof, and FIG. 6B is an explanatory diagram schematically illustrating how rays of light are scattered and reflected on the surface of the light guiding plate of FIG. 6A.

Figure 8:
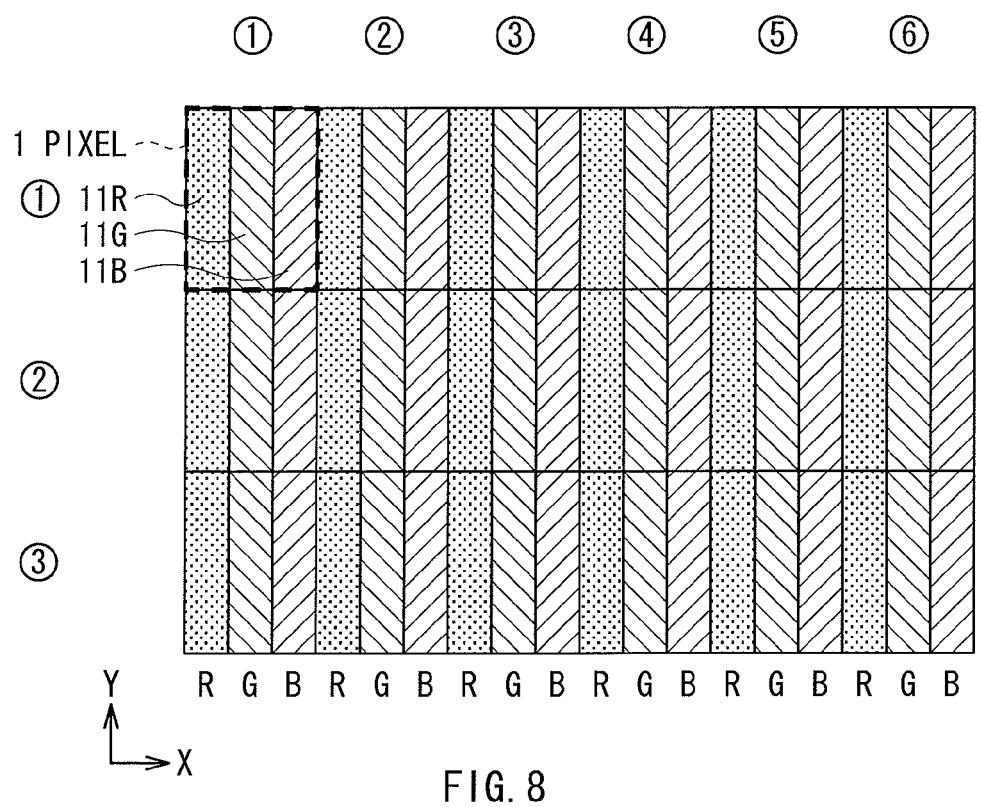
FIG. 8 is a plan view of a display section, showing an exemplary pixel configuration therein.
Figure 9:
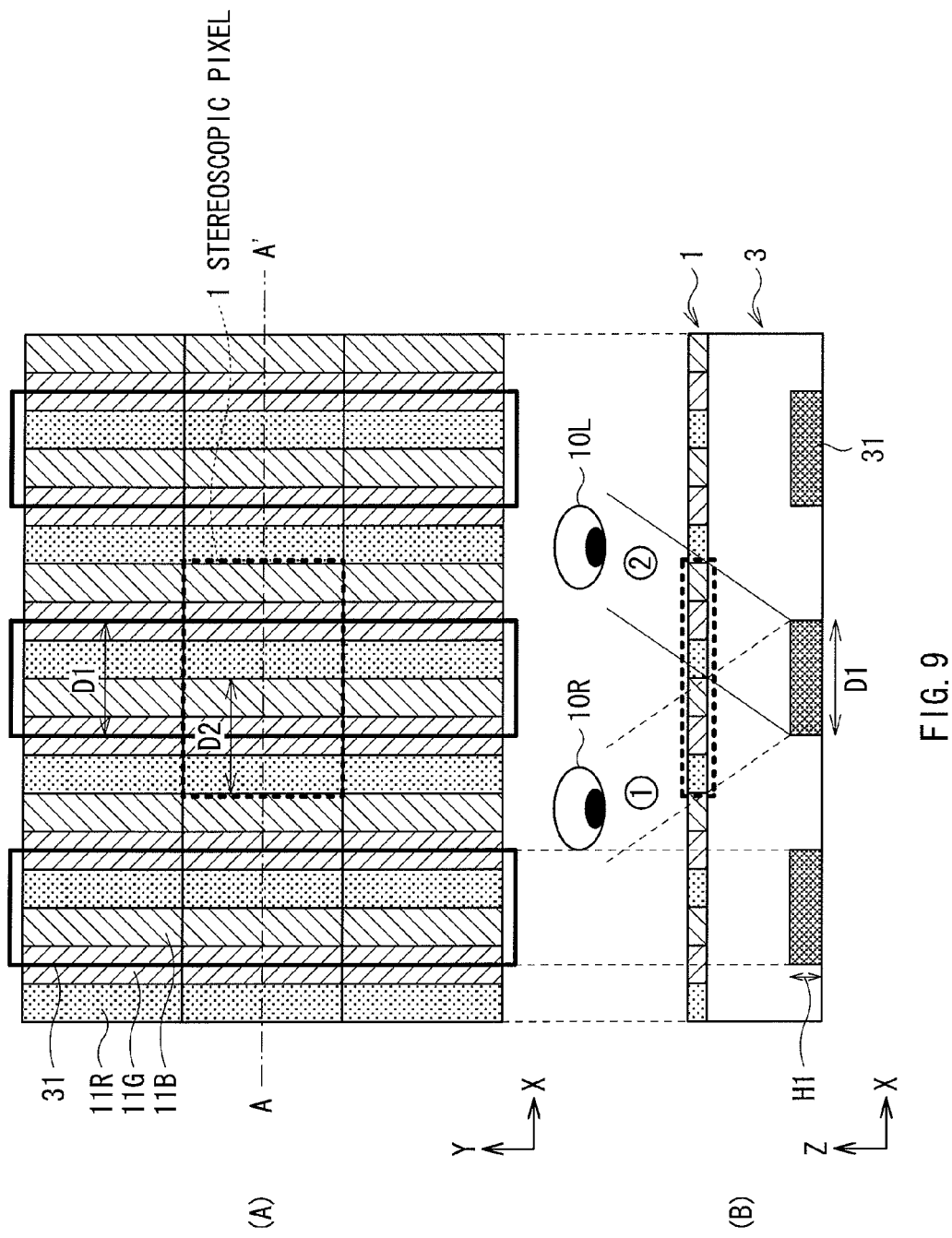

(A) of FIG. 9 is a plan view of the display section of FIG. 8, showing the pixel configuration therein with a first exemplary correspondence relationship between an allocation pattern for two perspective images and a placement pattern for scattering regions, and (B) of FIG. 9 is a cross-sectional view thereof.

Figure 1:
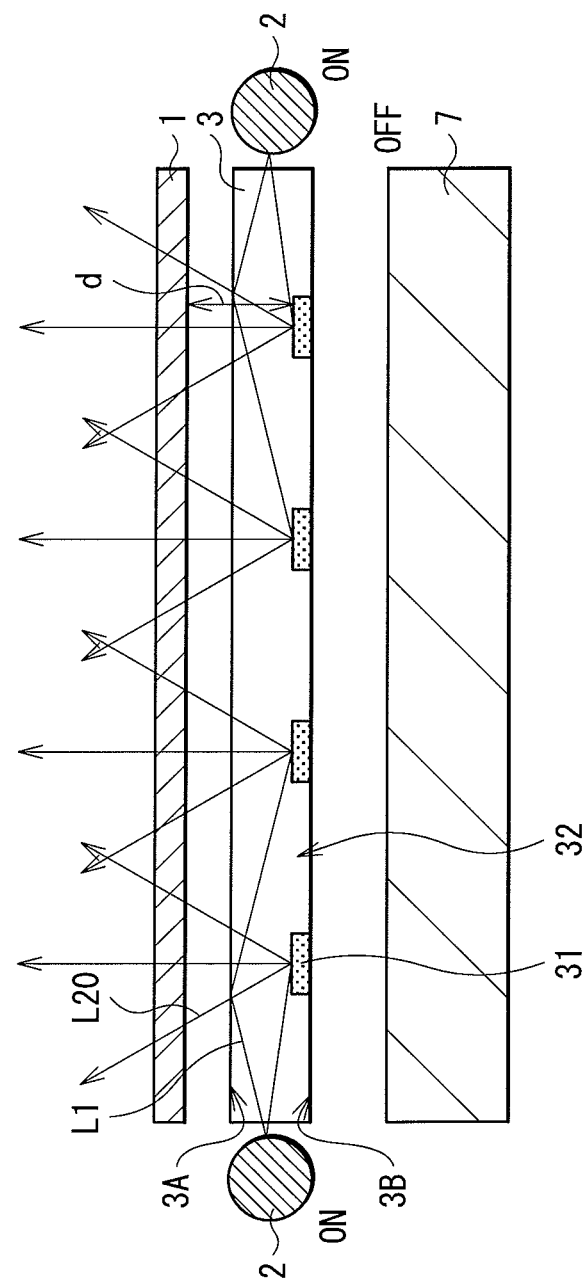
FIG. 1 is a cross-sectional view of a display in a first embodiment of the present disclosure, showing an exemplary configuration thereof together with how rays of light are emitted from a light source device in which only a first light source is in the state of ON (light-on state).

FIG. 10A is a cross-sectional view of the display of FIG. 1, showing how rays of light are emitted from the light source device when only the second light source is in the state of ON (light-on state), and FIG. 10B is an explanatory diagram schematically illustrating the luminance distribution in the state of light emission of FIG. 10A.

Figure 11A:
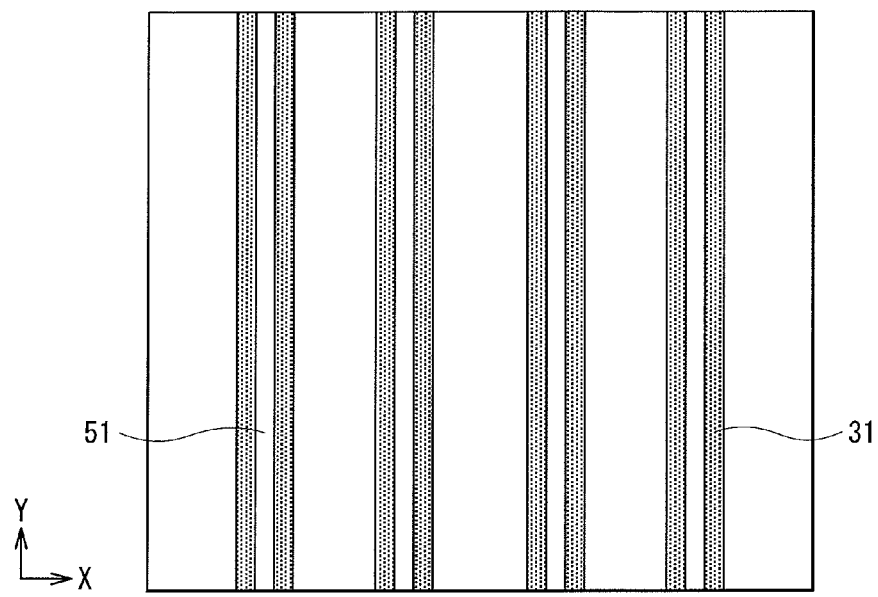
Figure 11B:
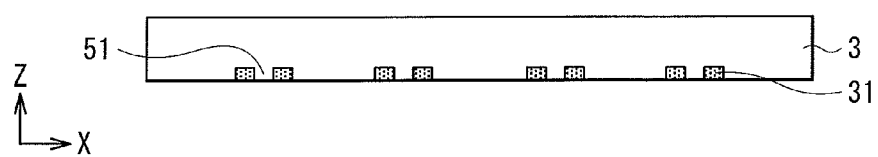

FIG. 11A is a plan view of a first example in which scattering regions are each provided therein with a pass-through region, and FIG. 11B is a cross-sectional view thereof.

FIG. 12A is a cross-sectional view in a case where the scattering regions are each provided therein with the pass-through region, showing how rays of light are emitted from the light source device in which only the second light source is in the state of ON (light-on state), and FIG. 12B is an explanatory diagram schematically illustrating the luminance distribution in the state of light emission of FIG. 12A.

Figure 13A:
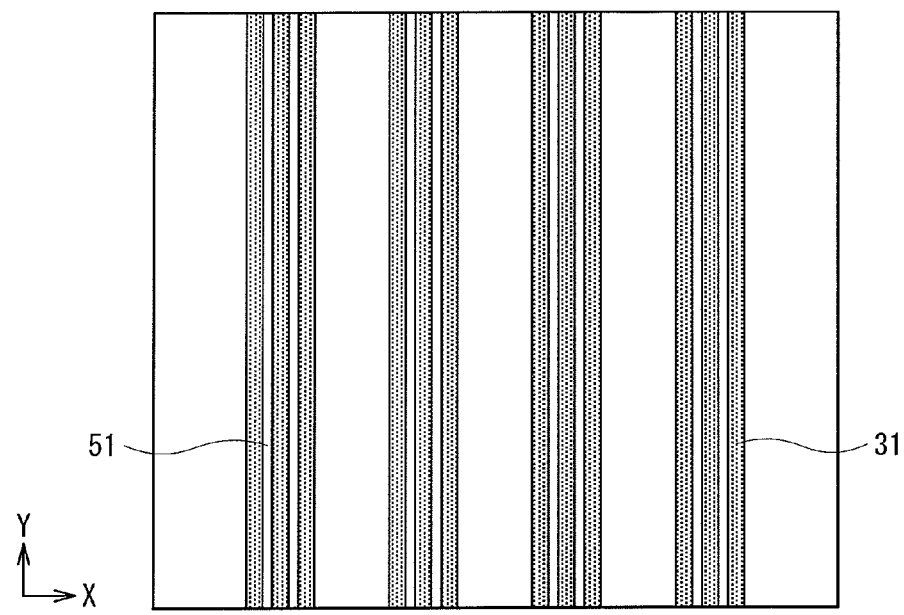
Figure 13B:
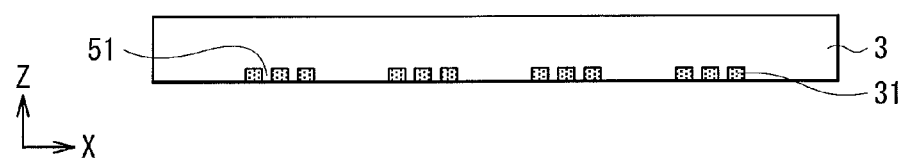

FIG. 13A is a plan view of a second example in which the scattering regions are each provided therein with the pass-through region, and FIG. 13B is a cross-sectional view thereof.

Figure 14A:
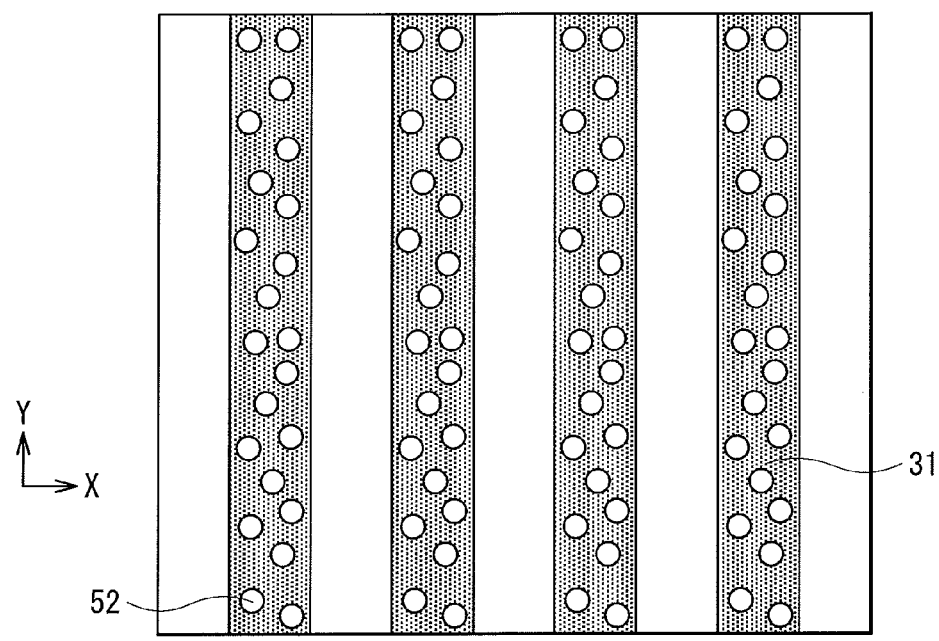
Figure 14B:
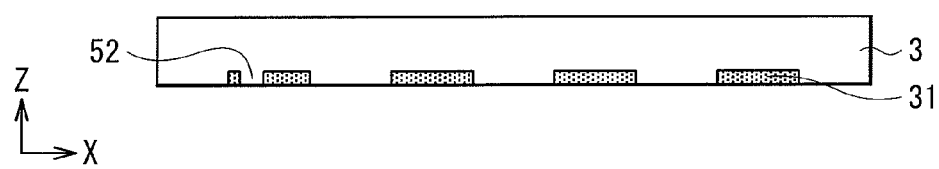

FIG. 14A is a plan view of a third example in which the scattering regions are each provided therein with the pass-through region, and FIG. 14B is a cross-sectional view thereof.

FIG. 15A is a plan view and a cross-sectional view showing a correspondence relationship between the scattering regions not provided with the pass-through region and the pixels in the display section, FIG. 15B is a plan view and a cross-sectional view showing a correspondence relationship between the scattering regions in the first examples, i.e., each provided therein with the pass-through region, and the pixels in the display section, and FIG. 15C is a plan view and a cross-sectional view showing a correspondence relationship between the scattering regions in the third examples, i.e., each provided therein with the pass-through region, and the pixels in the display section.

FIG. 16A is a plan view and a cross-sectional view of a fourth example in which the scattering regions are each provided therein with the pass-through region, FIG. 16B is a plan view and a cross-sectional view of a fifth example in which the scattering regions are each provided therein with the pass-through region, and FIG. 16C is a plan view and a cross-sectional view of a sixth example in which the scattering regions are each provided therein with the pass-through region.

Figure 17:
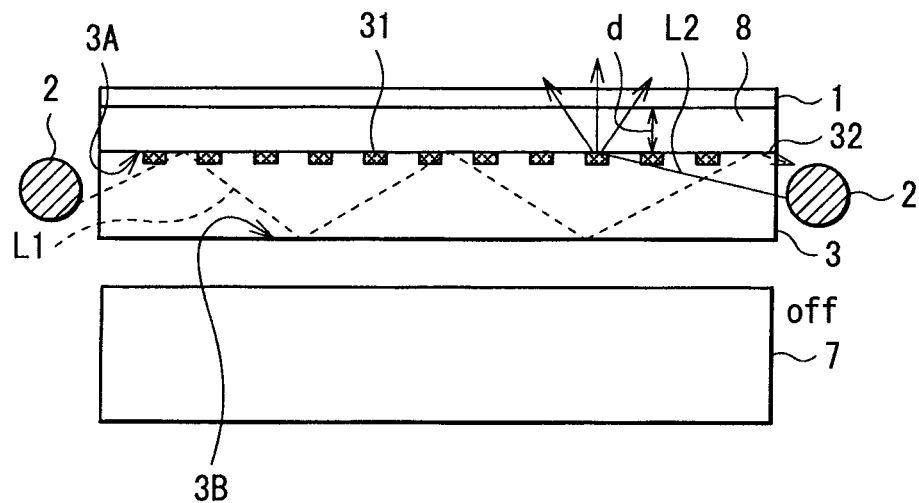

FIG. 17 is a cross-sectional view of a display in a second embodiment of the present disclosure, showing an exemplary configuration thereof together with how rays of light are emitted from a light source device.

Figure 18A:
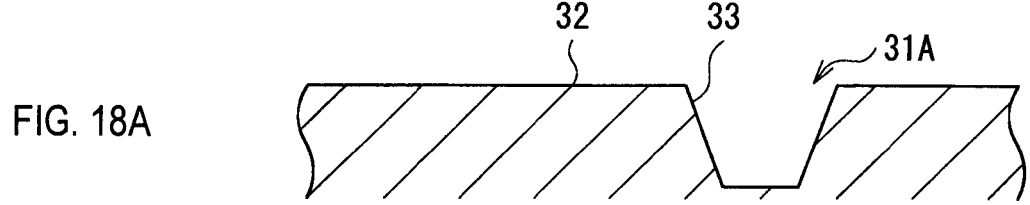
Figure 18B:
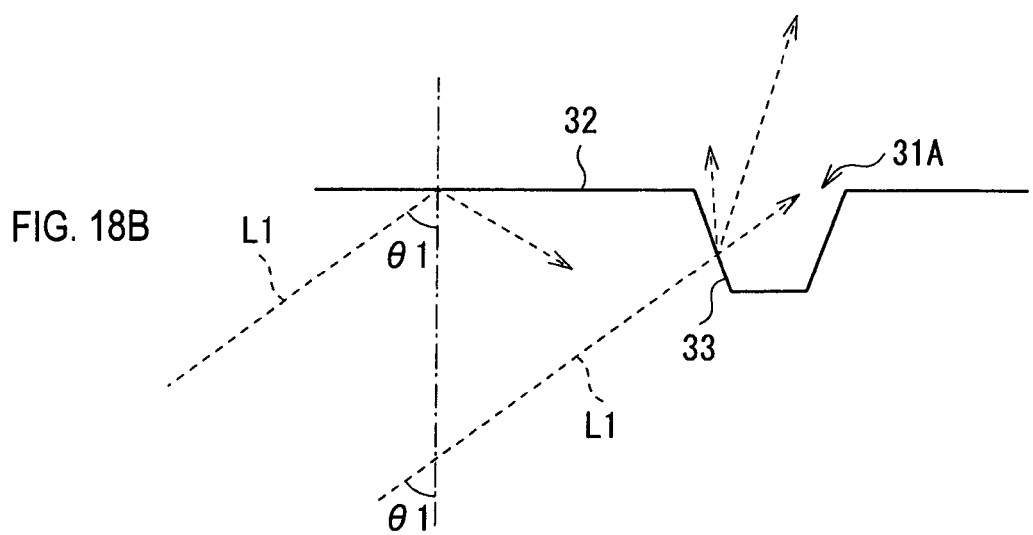

FIG. 18A is a cross-sectional view of a light guiding plate in the display of FIG. 17, showing a first exemplary design of the surface thereof, and FIG. 18B is an explanatory diagram schematically illustrating how rays of light are scattered and reflected on the surface of the light guiding plate of FIG. 18A.

Figure 19A:
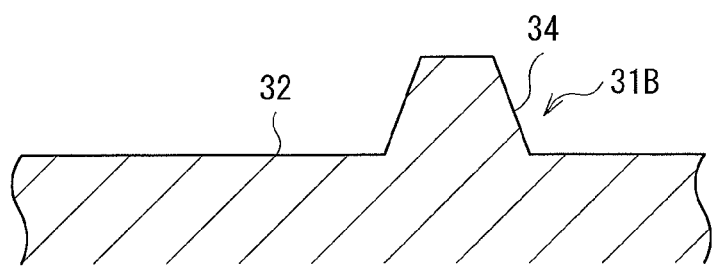
Figure 19B:
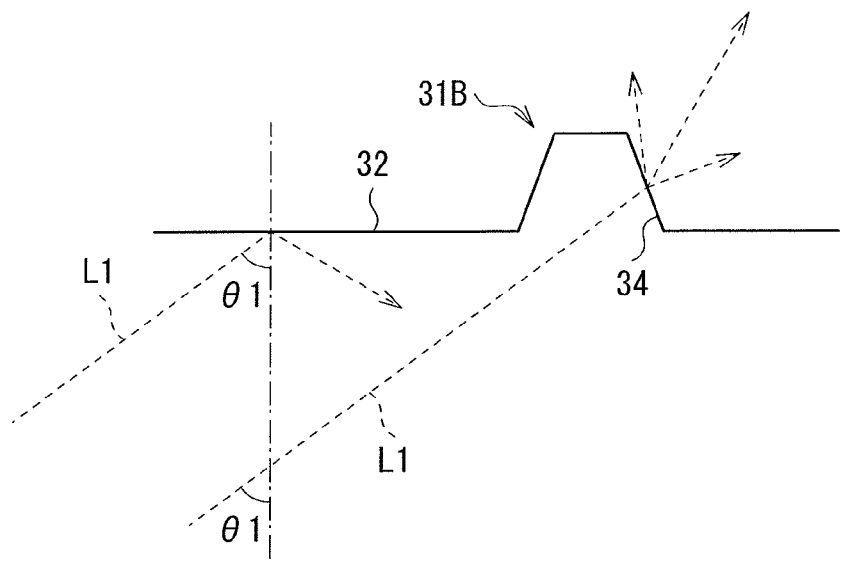

FIG. 19A is a cross-sectional view of the light guiding plate in the display of FIG. 17, showing a second exemplary design of the surface thereof, and FIG. 19B is an explanatory diagram schematically illustrating how rays of light are scattered and reflected on the surface of the light guiding plate of FIG. 19A.

Figure 20A:
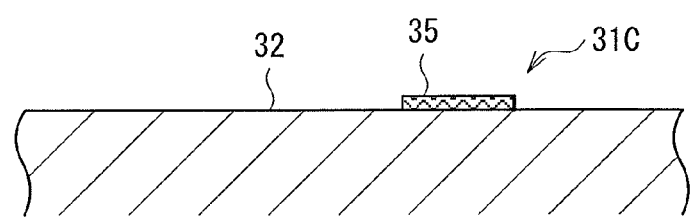
Figure 20B:
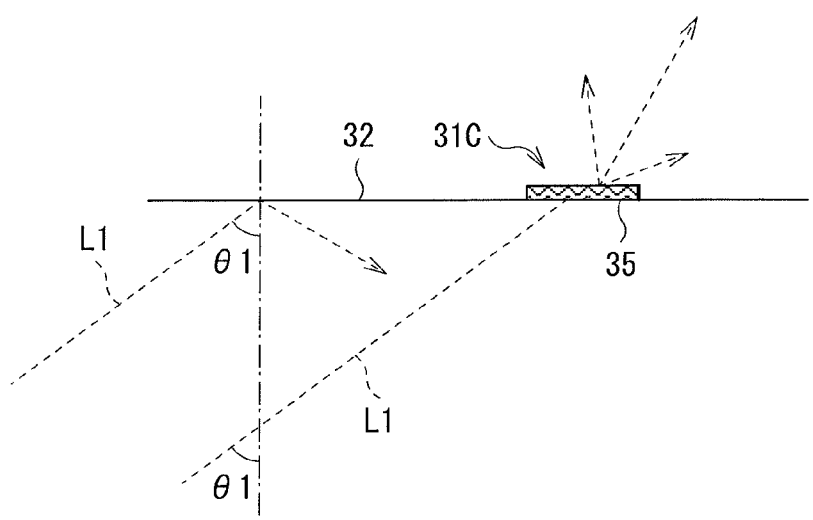

FIG. 20A is a cross-sectional view of the light guiding plate in the display of FIG. 17, showing a third exemplary design of the surface thereof, and FIG. 20B is an explanatory diagram schematically illustrating how rays of light are scattered and reflected on the surface of the light guiding plate of FIG. 20A.

DETAILED DESCRIPTION OF THE PREFERRED EMBODIMENTS

In the below, embodiments of the present disclosure are described in detail by referring to the accompanying drawings.

First Embodiment

Entire Configuration of Display

Figure 2:
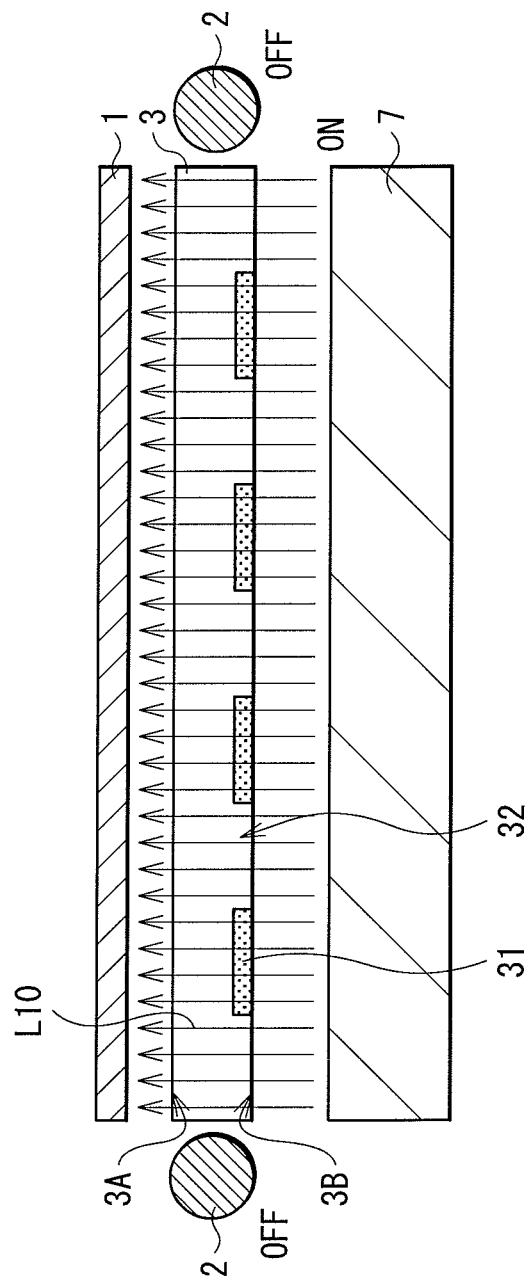
FIG. 2 is a cross-sectional view of the display of FIG. 1, showing the exemplary configuration thereof together with how rays of light are emitted from the light source device in which only a second light source is in the state of ON (light-on state).

FIGS. 1 and 2 each show an exemplary configuration of a display in a first embodiment of the present disclosure. This display is provided with a display section 1 in charge of image display, and a light source device. The light source device is disposed on the rear surface side of the display 1 for emitting light theretoward for image display thereon. The light source device is configured to include a first light source 2 (light source for 2D/3D display), a light guiding plate 3, and a second light source 7 (light source for 2D display). The light guiding plate 3 is provided with first and second internal reflection faces 3A and 3B. The first internal reflection face 3A is disposed to face the display section 1, and the second internal reflection face 3B is disposed to face the second light source 7. Note here that this display is provided also with a control circuit or others for use by the display section 1 to make display, but their configurations are not described herein as are similar to those of a general control circuit or others for display use. Although not shown, the light source device is provided with a control circuit in charge of ON (light-on)/OFF (light-off) control over the first and second light sources 2 and 7.

This display is capable of arbitrarily selectively making a mode change between a full-screen 2D display mode and a full-screen 3D display mode. The mode change between the 2D display mode and the 3D display mode is performed by two types of change control, i.e., one is change control over image data for display on the display section 1, and the other is change control over ON and OFF of the first and second light sources 2 and 7. The state schematically shown in FIG. 1, i.e., how rays of light are emitted from the light source device when only the first light source 2 is in the state of ON (light-on state), corresponds to the 3D display mode. The state schematically shown in FIG. 2, i.e., how rays of light are emitted from the light source device when only the second light source 7 is in the state of ON (light-on state), corresponds to the 2D display mode. Note that the state shown in FIG. 2 is ideal for how second illumination light L10 is emitted from the second light source 7.

The display section 1 is configured by a transmissive 2D display panel, e.g., a transmissive liquid crystal display panel. As exemplarily shown in FIG. 8, the display section 1 is provided with a plurality of pixels including R (red) pixels 11R, G (green) pixels 11G, and B (blue) pixels 11B. These pixels are arranged in a matrix. Such a display section 1 makes image display two-dimensionally by modulating, on a pixel basis, light coming from the light source device according to image data. For image display on the display section 1, images are arbitrarily selectively changed, i.e., a plurality of perspective images based on 3D image data, and an image based on 2D image data. Herein, the 3D image data is the one including a plurality of perspective images respectively corresponding to a plurality of viewing-angle directions for 3D display. For two-eye 3D display, for example, the 3D image data is about perspective images for right- and left-eye display. For image display in the 3D display mode, generated is a synthesized image including a plurality of stripe-shaped perspective images for display on a full screen of the display section 1, for example. Note that a specific exemplary correspondence relationship between a pattern of allocating a plurality of perspective images to each pixel in the display section 1, and a placement pattern for scattering regions 31 will be described later in detail.

The first light source 2 is configured by a fluorescent lamp such as CCFL (Cold Cathode Fluorescent Lamp), or an LED (Light Emitting Diode), for example. The first light source 2 directs first illumination light L1 (FIG. 1) toward the inside of the light guiding plate 3 from the side-surface direction. The first light source 2 is provided at least on the side surface of the light guiding plate 3. When the light guiding plate 3 is in the shape of square in a planar view, for example, there are four side surfaces. However, the first light source 2 may be provided at least one of the four side surfaces. FIG. 1 shows an exemplary configuration in which the first light source 2 is provided on two opposing side surfaces of the light guiding plate 3. The first light source 2 is controlled to be ON (light-on) or OFF (light-off) in response to a mode change between the 2D display mode and the 3D display mode. To be specific, for image display on the display section 1 based on the 3D image data (in the 3D display mode), the first light source 2 is controlled to be in the light-on state, and for image display on the display section 1 based on the 2D image data (in the 2D display mode), the first light source 2 is controlled to be in the light-off or light-on state.

The second light source 7 is opposed to the light guiding plate 3 on the side where the second internal reflection face 3B is formed. The second light source 7 directs the second illumination light L10 toward the second internal reflection face 3B from the outside (see FIG. 2). The second light source 7 may be a flat light source that emits light with a uniform in-plane luminance, and may be any commercially-available flat backlight because the configuration thereof is not specifically restricted. A possible configuration of the second light source 7 includes a luminous body such as CCFL or LED, and a light diffusing plate for making uniform the in-plane luminance. In response to a mode change between the 2D display mode and the 3D display mode, the second light source 7 is controlled to be ON (light-on) or OFF (light-off). To be specific, for image display on the display section 1 based on the 3D image data (in the 3D display mode), the second light source 7 is controlled to be in the light-off state, and for image display on the display section 1 based on the 2D image data (in the 2D display mode), the second light source 7 is controlled to be in the light-on state.

The light guiding plate 3 is configured by a transparent plastic plate made of acrylic resin, for example. The light guiding plate 3 is entirely transparent except the second internal reflection face 3B. When the light guiding plate 3 is in the shape of square in a planar view, for example, the first internal reflection face 3A and the four side surfaces are entirely transparent.

The first internal reflection face 3A is entirely minor finished, thereby totally reflecting, in the light guiding plate 3, any rays of light coming at a light-incident angle satisfying the condition for total reflection, and emitting any rays of light not satisfying the condition for total reflection to the outside.

The second internal reflection face 3B includes the scattering regions 31, and total reflection regions 32. As will be described later, the scattering regions 31 are each formed by processing the surface of the light guiding plate 3, e.g., by laser processing, sandblast processing, coating processing, or by affixing a sheet-like light scattering member thereto. In the second internal reflection face 3B, when a mode change is made to the 3D display mode, the scattering regions 31 each function as the aperture sections (slit sections) of a parallax barrier with respect to the first illumination light L1 coming from the first light source 2, and the total reflection regions 32 each function as the light shielding section thereof. In the second internal reflection face 3B, the scattering regions 31 and the total reflection regions 32 are provided in a pattern to be configured like a parallax barrier. In other words, the total reflection regions 32 are provided in a pattern to be like the light shielding sections of the parallax barrier, and the scattering regions 31 are provided in a pattern to be like the aperture sections of the parallax barrier. Herein, the barrier pattern of the parallax barrier is known to look like stripes including a large number of vertically-long slit-shaped aperture sections arranged side by side in the horizontal direction via the light shielding sections, for example. However, the barrier pattern is not specifically restrictive, and various previous types of barrier patterns may be used.

The first internal reflection face 3A and the total reflection regions 32 in the second internal reflection face 3B serve to internally totally reflect any rays of light coming at a light-incident angle θ1 satisfying the condition for total reflection, i.e., internally totally reflect any rays of light coming at the light-incident angle θ1 larger than a predetermined critical angle α. With such a configuration, the first illumination light L1 coming from the first light source 2 at the light-incident angle θ1 satisfying the condition for total reflection is directed in the side-surface direction by internal total reflection between the first internal reflection face 3A and the total reflection regions 32 in the second internal reflection face 3B. Also as shown in FIG. 2, the total reflection regions 32 allow the second illumination light L10 coming from the second light source 7 to pass therethrough, and direct the resulting light toward the first internal reflection face 3A as rays of light not satisfying the condition for total reflection.

Herein, assuming that the light guiding plate 3 has the refractive index of n1, and a medium (air layer) outside of the light guiding plate 3 has the refractive index of n0 (<n1), the critical angle α is expressed as below.

$$\sin \alpha = n0/n1$$

where α and θ1 are each an angle with respect to the normal to the surface of the light guiding plate. The light-incident angle θ1 satisfying the condition for total reflection is θ1>α.

As shown in FIG. 1, the scattering regions 31 each serve to scatter and reflect the first illumination light L1 coming from the first light source 2, and toward the first internal reflection face 3A, emit at least part of the first illumination light L1 as rays of light not satisfying the condition for total reflection, i.e., as scattered rays of light L20.

Configuration Modification of Display

Figure 3:
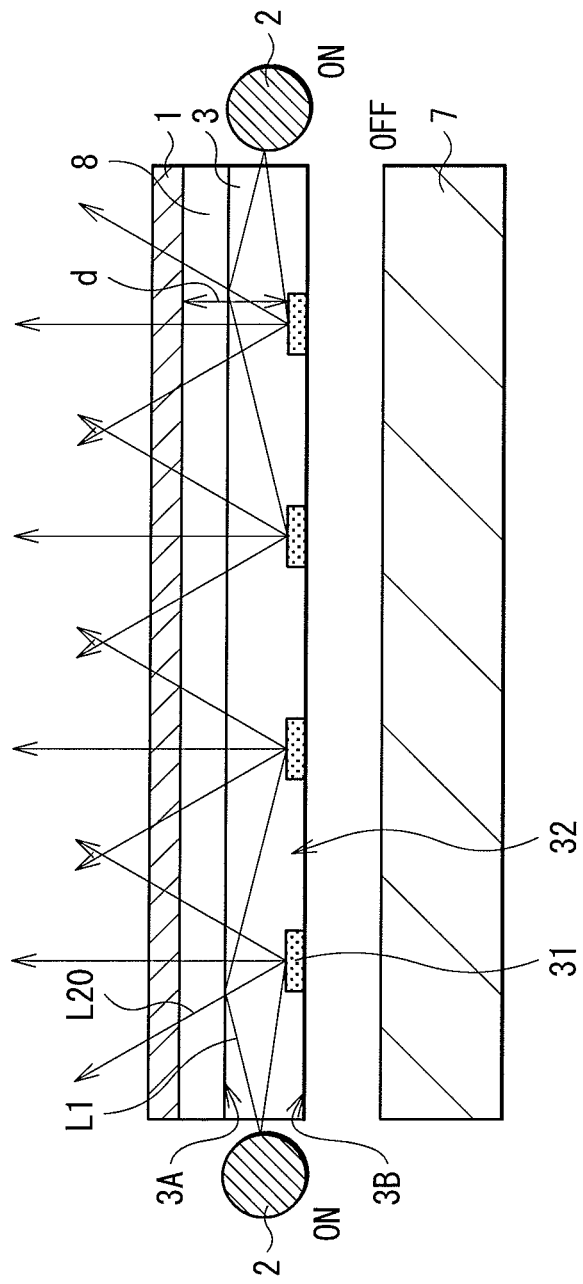
FIG. 3 is a cross-sectional view of the display of FIG. 1 in a first modification.

In the display of FIG. 1, for spatial separation of a plurality of perspective images displayed on the display section 1, the pixel section of the display section 1 is expected to oppose to the scattering regions 31 of the light guiding plate 3 with a predetermined distance d therebetween. In FIG. 1, the display section 1 and the light guiding plate 3 are disposed with an air space therebetween. Alternatively, as shown in a first modification of FIG. 3, a spacer 8 may be disposed between the display section 1 and the light guiding plate 3 with the aim of keeping the predetermined distance d therebetween. The spacer 8 may be made of a colorless and transparent material not causing light scattering that much, e.g., PMMA (polymethyl methacrylate). This spacer 8 may be so provided as to entirely cover the surface on the rear surface side of the display section 1 and the surface of the light guiding plate 3, or to partially take up the least amount of space expected to keep the distance d.

Figure 4:
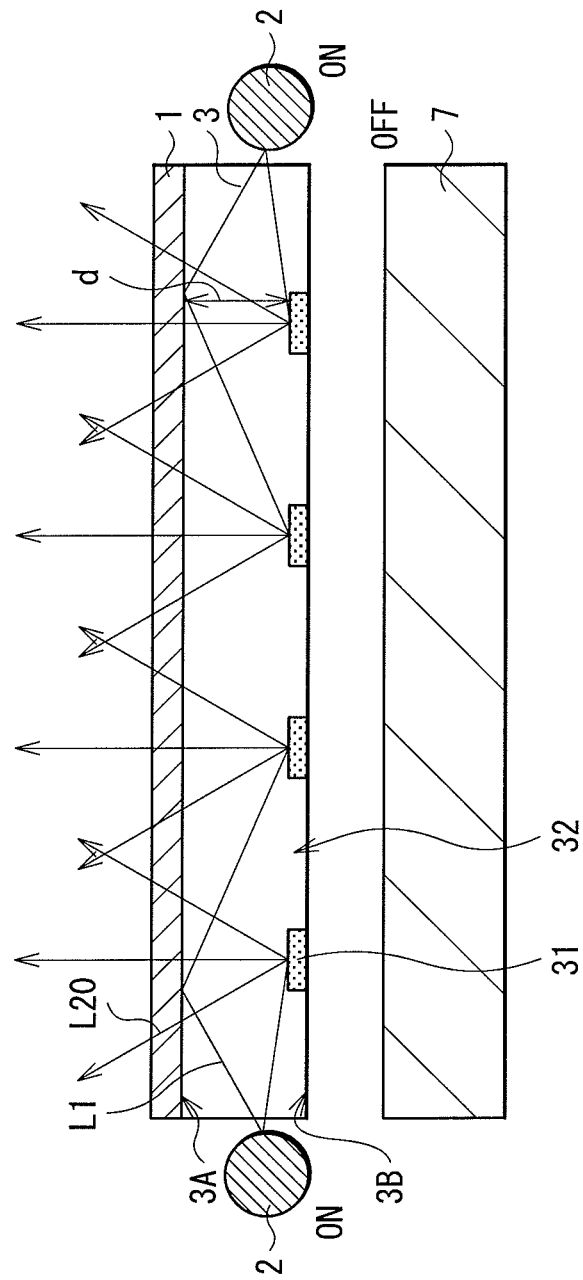
FIG. 4 is a cross-sectional view of the display of FIG. 1 in a second modification.

Still alternatively, as a second modification of FIG. 4, the light guiding plate 3 may be increased in thickness in its entirety to eliminate the air space.

Specific Exemplary Configuration of Scattering Region 31

Figure 5A:
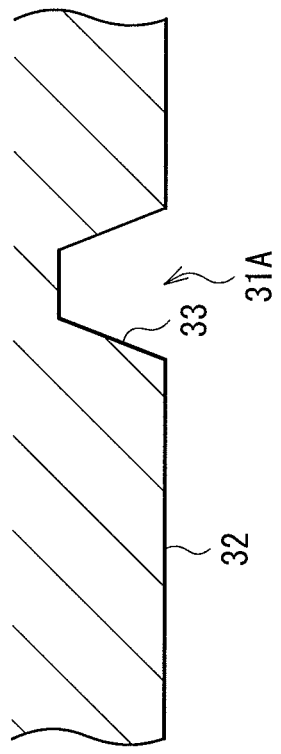
FIG. 5A is a cross-sectional view of a light guiding plate in the display of FIG. 1, showing a first exemplary design of the surface thereof.
Figure 5B:
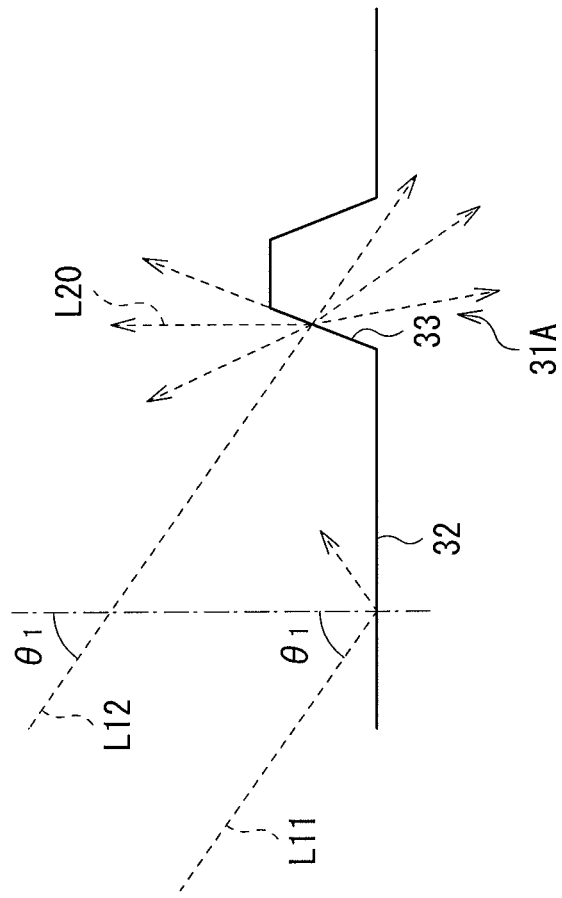
FIG. 5B is an explanatory diagram schematically illustrating how rays of light are scattered and reflected on the surface of the light guiding plate of FIG. 5A.

FIG. 5A shows a first exemplary design of the second internal reflection face 3B of the light guiding plate 3. FIG. 5B schematically shows how rays of light are reflected and scattered on the second internal reflection face 3B in the first exemplary configuration of FIG. 5A. With this first exemplary design, the scattering region 31 is shaped concave with respect to the total reflection region 32, i.e., concave-shaped scattering region 31A. Such a concave-shaped scattering region 31A is formed by sandblast processing or laser processing, for example. As an example, to form the concave-shaped scattering region 31A, after mirror-finishing the surface of the light guiding plate 3, any portion corresponding to the scattering region 31A is subjected to laser processing. With this first exemplary design, on the second internal reflection face 3B, first illumination light L11 coming from the first light source 2 at the light-incident angle θ1 satisfying the condition for total reflection is internally totally reflected on the total reflection regions 32. On the other hand, with the concave-shaped scattering region 31A, even if the first illumination light L12 comes at the light-incident angle θ1 same as that to the total reflection regions 32, the first illumination light L12 partially fails to satisfy the condition for total reflection on a side surface portion 33 of the concave-shaped region. As a result, the first illumination light L12 is partially scattered and passed through the portion, and the remaining light is scattered and reflected. The rays of light scattered and reflected as such, i.e., scattered rays of light L20, are partially or entirely emitted toward the first internal reflection face 3A as rays of light not satisfying the condition for total reflection as shown in FIG. 1.

FIG. 6A shows a second exemplary design of the second internal reflection face 3B in the light guiding plate 3. FIG. 6B schematically shows how rays of light are reflected and scattered on the second internal reflection face 3B in the second exemplary configuration of FIG. 6A. With this second exemplary design, the scattering region 31 is shaped convex with respect to the total reflection region 32, i.e., convex-shaped scattering region 31B. Such a convex-shaped scattering region 31B is formed by subjecting the surface of the light guiding plate 3 to molding. In this case, any portion corresponding to the total reflection region 32 is subjected to mirror processing by the surface of the mold. With this second exemplary design, on the second internal reflection face 3B, the first illumination light L11 coming from the first light source 2 at the light-incident angle θ1 satisfying the condition for total reflection is internally totally reflected on the total reflection regions 32. On the other hand, with the convex-shaped scattering regions 31B, even if the first illumination light L12 comes at the light-incident angle θ1 same as that to the total reflection regions 32, the first illumination light L12 partially fails to satisfy the condition for total reflection on a side surface portion 34 of the convex-shaped region. As a result, the first illumination light L12 is partially scattered and passed through the portion, and the remaining light is scattered and reflected. The rays of light scattered and reflected as such, i.e., scattered rays of light L20, are partially or entirely emitted toward the first internal reflection face 3A as rays of light not satisfying the condition for total reflection as shown in FIG. 1.

Figure 7A:
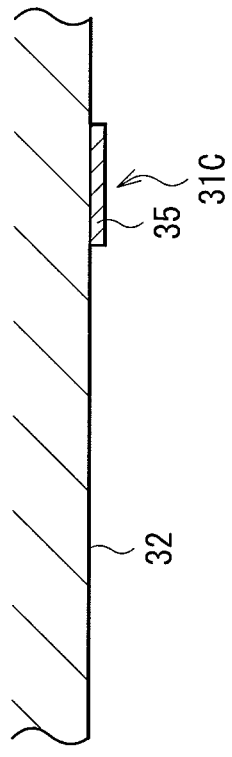
FIG. 7A is a cross-sectional view of the light guiding plate in the display of FIG. 1, showing a third exemplary design of the surface thereof.
Figure 7B:
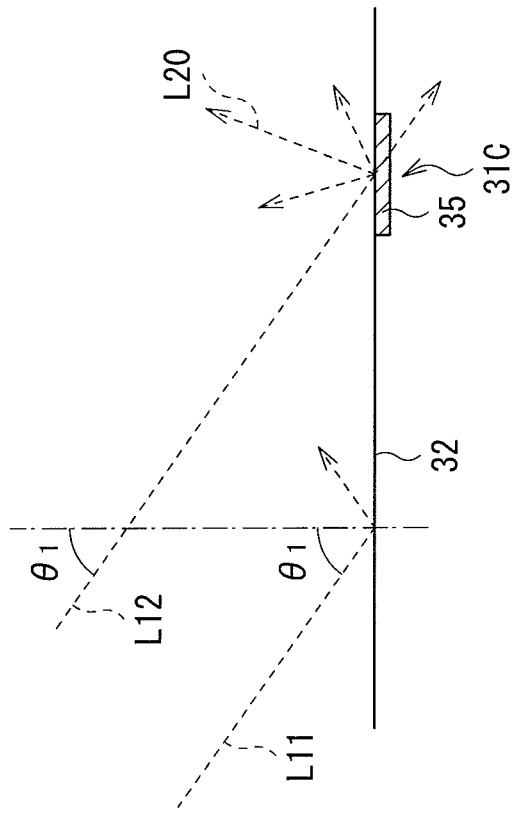
FIG. 7B is an explanatory diagram schematically illustrating how rays of light are scattered and reflected on the surface of the light guiding plate of FIG. 7A.

FIG. 7A shows a third exemplary design of the second internal reflection face 3B in the light guiding plate 3. FIG. 7B schematically shows how rays of light are reflected and scattered on the second internal reflection face 3B in the third exemplary configuration of FIG. 7A. With the exemplary designs of FIGS. 5A and 6A, the scattering region 31 is formed by processing the surface of the light guiding plate 3 to be shaped differently from the total reflection region 32. On the other hand, a scattering region 31C in this exemplary configuration of FIG. 7A is not processed on the surface but the surface portion of the light guiding plate 3 corresponding to the second internal reflection face 3B is provided with a light scattering member 35 made of a material different from that of the light guiding plate 3. If this is the case, using paint in color of white as the light scattering member 35, e.g., barium sulfate, the scattering region 31C is formed by screen printing for patterning on the surface of the light guiding plate 3. With this third exemplary design, on the second internal reflection face 3B, the first illumination light L11 coming from the first light source 2 at the light-incident angle θ1 satisfying the condition for total reflection is internally totally reflected on the total reflection regions 32. On the other hand, with the scattering regions 31C each provided with the light scattering member 35, even if the first illumination light L12 comes at the light-incident angle θ1 same as that to the total reflection regions 32, due to the light scattering members 35, the first illumination light L12 is partially scattered and passed through the regions, and the remaining light is scattered and reflected. The rays of light scattered and reflected as such are partially or entirely emitted toward the first internal reflection face 3A as rays of light not satisfying the condition for total reflection.

Basic Operation of Display

In this display, for display in the 3D display mode, image display is made on the display section 1 based on 3D image data, and at the same time, the first and second light sources 2 and 7 are put under the control of ON (light-on)/OFF (light-off) for 3D display. To be specific, as shown in FIG. 1, the first light source 2 is controlled to be in the state of ON (light-on), and the second light source 7 is controlled to be in the state of OFF (light-off). In this state, the first illumination light L1 coming from the first light source 2 is repeatedly internally totally reflected in the light guiding plate 3, i.e., between the first internal reflection face 3A and the total reflection regions 32 of the second internal reflection face 3B so that the first illumination light L1 is directed from one of the side surfaces where the first light source 2 is provided to the other opposite side surface for emission therefrom. At the same time, the first illumination light L1 coming from the first light source 2 is partially scattered and reflected on the scattering regions 31 of the light guiding plate 3 so that the first illumination light L1 passes through the first internal reflection face 3A of the light guiding plate 3, and then is emitted to the outside of the light guiding plate 3. As such, the light guiding plate itself 3 is provided with the functions as a parallax barrier. In other words, when the first illumination light L1 comes from the first light source 2, the light guiding plate 3 is functioned equivalently as a parallax barrier with the scattering regions 31 serving as the aperture sections (slit sections), and the total reflection regions 32 serving as the light shielding sections. As such, equivalently, 3D display using the technology of parallax barrier is performed with a parallax barrier provided on the rear surface side of the display section 1.

On the other hand, for display in the 2D display mode, image display is made on the display section 1 based on 2D image data, and at the same time, the first and second light sources 2 and 7 are put under the control of ON (light-on)/OFF (light-off) for 2D display. To be specific, as shown in FIG. 2, for example, the first light source 1 is controlled to be in the state of OFF (light-off), and the second light source 7 is controlled to be in the state of ON (light-on). In this state, the second illumination light L10 coming from the second light source 7 passes through the total reflection regions 32 and the scattering regions 31 in the second internal reflection face 3B. The second illumination light L10 is thus emitted from almost entirely the first internal reflection face 3A to the outside of the light guiding plate 3 as rays of light not satisfying the condition for total reflection. In other words, the light guiding plate 3 functions as a flat light source similarly to any general backlight. As such, equivalently, 2D display using the technology of backlight is performed with a general backlight provided on the rear surface side of the display section 1.

Herein, even if only the second light source 7 is turned ON, the second illumination light L10 comes from an almost entire surface of the light guiding plate 3. Alternatively, if appropriate, the first light source 2 may be also turned ON. If this is the case, when turning ON only the second light source 7 causes a difference of luminance distribution between the portions corresponding to the scattering regions 31 and the portions corresponding to the total reflection regions 32, adjusting appropriately the state of illumination of the first light source 2, i.e., performing ON/OFF control or adjusting the level of illumination, may optimize the luminous distribution for the full screen. Note that, for 2D image display, if the luminous is to be sufficiently adjusted on the display section 1 side, turning ON only the second light source 7 will do.

Correlation between Allocation Pattern for Perspective Images and Placement Pattern for Scattering Regions 31

In this display, for display in the 3D display mode, the display section 1 makes display through allocation of a plurality of perspective images to each corresponding pixel using a predetermined allocation pattern. The scattering regions 31 in the light guiding plate 3 are provided according to a predetermined placement pattern corresponding to the predetermined allocation pattern.

In the below, described is a specific exemplary correspondence relationship between the allocation pattern for perspective images and the placement pattern for the scattering regions 31. In the following description, in a plane parallel to the display surface of the display section 1, or to the second internal reflection face 3B of the light guiding plate 3, a first direction (vertical direction) is referred to as Y direction, and a second direction (horizontal direction) orthogonal to the first direction is referred to as X direction. A direction orthogonal to both the Y and X directions (thickness direction) is referred to as Z direction.

As shown in FIG. 8, the pixel configuration of the display section 1 is provided with a plurality of pixels, including the red pixels 11R, the green pixels 11G, and the blue pixels 11B. These pixels are assumed to be arranged in a matrix in the Y and X directions. In the X direction, the pixels 11R, 11G, and 11B in three colors are so arranged that the three colors appear periodically in alternate order, and in the Y direction, the pixels 11R, 11G, and 11B are so arranged to be the same in color. In such a pixel configuration, for display of general 2D images on the display section 1, i.e., in the 2D display mode, the combination of pixels in three colors continuously arranged in the X direction, i.e., the pixels 11R, 11G, and 11B, works as a piece of pixel for 2D color display, i.e., a unit pixel for 2D color display. FIG. 8 shows six unit pixels for 2D color display in the X direction, and three unit pixels therefor in the Y direction.

(A) of FIG. 9 shows an exemplary correspondence relationship between the patterns in the pixel configuration of FIG. 8, i.e., the allocation pattern when each pixel in the display section 1 is allocated with two perspective images (first and second perspective images), and the placement pattern for the scattering regions 31. (B) of FIG. 9 corresponds to the cross-section of a portion cut along A-A' in (A) of FIG. 9. (B) of FIG. 9 schematically shows how the two perspective images are separated from each other. In this example, a unit pixel for 2D color display is allocated as a pixel for display of a piece of perspective image, and the pixel allocation is so performed that the first and second perspective images are displayed alternately in the X direction. Accordingly, the combination of two unit pixels for 2D color display in the X direction is a unit pixel for 3D display, i.e., a stereoscopic pixel. As shown in (B) of FIG. 9, stereoscopic viewing is performed by the first perspective image reaching only a right eye 10R of a viewer, and by the second perspective image reaching only a left eye 10L of the viewer. In this example, the scattering regions 31 are each so disposed that the position thereof in the X direction comes at substantially the center portion of the corresponding unit image for 3D display. Moreover, the scattering regions 31 each extend in the Y direction between the two side surfaces of the light guiding plate 3 opposing to each other in the Y direction, and are arranged side by side in the X direction.

Herein, the scattering region 31 is assumed to have the X-direction width D1 having a predetermined relationship with the width D2 of a pixel for displaying a perspective image. To be specific, the width D1 of the scattering region 31 is preferably 0.5 times or more but 1.5 times or less of the width D2. The larger the width D1 of the scattering region 31, the likelier it becomes that the larger amount of light is to be scattered in the scattering region 31, and the amount of light coming from the light guiding plate 3 is to be increased. This thus leads to the higher luminance. However, if the width D1 of the scattering region 31 becomes more than 1.5 times of the width D2, this causes a mixture of light from the perspective images during image viewing, i.e., so-called crosstalk occurs, and thus is not preferable. Conversely, the smaller the width D1 of the scattering region 31, the likelier it becomes that the smaller amount of light is to be scattered in the scattering region 31, and the amount of light coming from the light guiding plate 3 is to be reduced. This thus results in the lower luminance. If the width D1 of the scattering region 31 becomes less than 0.5 times of the width D2, this causes too much reduction of the luminance. This is not preferable because the resulting image display looks too dark.

Moreover, as to the scattering region 31, the height (depth) H1 thereof from the surface of the light guiding plate, i.e., from the second internal reflection face 3B in this embodiment, is expected to have a predetermined relationship with respect to the width D1 thereof. To be specific, the height (depth) H1 preferably satisfies the following predetermined condition (1A). In other words, the height (depth) H1 is considered preferable if being smaller than twice the width D1 of the scattering region 31. The height (depth) H1 is considered more preferable if satisfying the following condition (1B). In other words, the height (depth) H1 is considered more preferable if being 0.2 times or more but 0.5 times or less of the width D1 of the scattering region 31. Note that, when the scattering region is concave-shaped as shown in FIG. 5A, i.e., the scattering region 31A, the height H1 is the height in the internal direction from the surface of the light guiding plate. Moreover, when the scattering region is convex-shaped as shown in FIG. 6A or is a print pattern or others as shown in FIG. 7A, i.e., the scattering region 31B or 31C, the height H1 is the height in the external direction from the surface of the light guiding plate.

$$0 < H1 < 2 \cdot D1 \quad (1A)$$

$$0.2 \leq H1 \leq 0.5 \cdot D1 \quad (1B)$$

In FIG. 9, described is the case with two perspectives as an example, but the number of perspectives (the number of perspective images to be displayed) is not restricted to two, and three or more perspectives will also do. Further, the allocation pattern for perspective images and the placement pattern for the scattering regions 31 in FIG. 9 are not surely restrictive, and any other pattern will also do. As an exemplary allocation pattern, a combination of the red pixel 11R, the green pixel 11G, and the blue pixel 11B in the oblique direction may be allocated as a pixel for display of a piece of perspective image. If this is the allocation pattern, the scattering regions 31 may be in the pattern of being placed in the slanting direction. Moreover, the scattering regions 31 may not be restricted to be in the pattern of being placed in succession in the Y direction or in the slanting direction as such. Alternatively, the scattering regions 31 may be discretely placed in the Y and X directions.

Preferable Exemplary Configuration of Scattering Region 31

FIG. 10A shows how rays of light are emitted when only the second light source 7 is in the state of ON (light-on state), i.e., in the 2D display mode, in the display of FIG. 1. FIG. 10B shows the luminance distribution in the X direction in the state of light emission in FIG. 10A. When only the second light source 7 is in the state of ON (light-on state), ideally, as shown in FIG. 2, the second illumination light L10 passes through equivalently the total reflection regions 32 and the scattering regions 31 in the light guiding plate 3, and is emitted to the outside uniformly from almost entirely the first internal reflection face 3A. However, in reality, as shown in FIGS. 10A and 10B, at the positions corresponding to the scattering regions 31, the rays of light to be emitted to the outside of the light guiding plate 3 may be reduced in luminance, and the luminance distribution may thus become not uniform. This is because light scattering occurs in the scattering regions 31, and the rays of light are thus changed in emission direction. Especially when the placement pattern for the scattering regions 31 is configured to correspond to the two perspectives, the reduction of luminance becomes conspicuous because the scattering regions 31 and the total reflection regions 32 have the one-to-one relationship. On the other hand, a larger number of perspectives prevent the reduction of luminance.

By referring to FIG. 11A to 16C, described next is a technique for improving the luminance distribution described above. In FIGS. 11A to 16C, exemplified is a case where the scattering regions 31 each extend in the Y direction, and are arranged side by side in the X direction. However, to improve the luminance distribution, the technique is also applicable to a case where the scattering regions 31 are in the pattern of being placed in the slanting direction, or in the pattern of being discretely placed in the Y and X directions, for example.

To improve the luminance distribution as above, the scattering regions 31 may be each provided therein with a pass-through region for the second illumination light L10 coming from the second light source 7 to pass therethrough. FIGS. 11A and 11B each show a first example thereof. In this example, a plurality of scattering regions 31 extending in the Y direction are each provided therein with a slit-shaped pass-through region 51 extending in the Y direction. The scattering regions 31 thus each look like being split into two.

FIG. 12A shows how rays of light are emitted from the second light source 7 in the first example of FIGS. 11A and 11B. FIG. 12B shows the luminance distribution in the X direction in the state of light emission of FIG. 12A. For a comparison purpose, FIG. 12B shows, by broken lines, the luminance distribution when the pass-through regions 51 are not provided. As shown in FIGS. 12A and 12B, with the pass-through regions 51 provided as such, the reduction of luminance is prevented in the scattering regions 31 so that the non-uniformity of the luminance distribution favorably shows improvement.

In the first example of FIGS. 11A and 11B, the slit-shaped pass-through region 51 is provided at the center of each scattering region 31 so that the resulting scattering region 31 looks like being split uniformly into two. Alternatively, the position for the slit-shaped pass-through region 51 may be off the center, and the resulting scattering region 31 may look like being split non-uniformly into two. Moreover, the number of the slit-shaped pass-through region 51 provided in each scattering region 31 is not restricted to one, and alternatively, each scattering region 31 may look like being split into three or more. For example, as a second example of FIGS. 13A and 13B, each scattering region 31 may look like being split uniformly into three by being provided therein with the two slit-shaped pass-through regions 51. Also when the scattering region 31 looks like being split into three or more, the size uniformity is not necessarily expected and the size non-uniformity will also do.

Further, the pass-through region 51 is not restricted to be slit-shaped, and any other shape will also do. Still further, each scattering region 31 may be provided therein with a plurality of pass-through regions, which are positioned at random. For example, as a third example of FIGS. 14A and 14B, each scattering region 31 may be provided therein with a plurality of pass-through regions 52 each shaped like a circle. Such a circular shape is surely not restrictive, and other various types of shapes will also do, e.g., oval shape, square shape, triangle shape, and star shape. Still alternatively, each scattering region 31 may be provided therein with the pass-through region shaped differently from others, or each scattering region 31 may have the pass-through region shaped and positioned differently from others.

FIG. 15A shows the correspondence relationship between the scattering regions 31 each not provided with the pass-through region, and the pixels in the display section 1. FIG. 15B shows the correspondence relationship similarly to that in the first example (FIGS. 11A and 11B), i.e., the slit-shaped pass-through region 51 is provided. FIG. 15C shows the correspondence relationship similar to that in the third example (FIGS. 14A and 14B), i.e., the circular pass-through region 52 is provided. FIGS. 15A to 15C each show a case similar to that in FIGS. 9A and 9B, i.e., the placement pattern for the scattering regions 31 corresponds to two perspectives, and a combination of two unit pixels in the X direction for 2D color display is a unit image for 3D image display (a stereoscopic pixel).

Other Exemplary Configuration of Pass-Through Region

FIGS. 16A to 16C respectively show fourth to sixth examples in which the scattering regions 31 are each provided therein with the pass-through region together with the correspondence relationship between the scattering regions 31 and the pixels in the display section 1. Herein, similarly to FIGS. 15A to 15C, exemplified is a case where the placement pattern for the scattering regions 31 corresponds to two perspectives.

In the fourth example of FIG. 16A, each scattering region 31 is provided therein with a plurality of pass-through regions 53 each shaped like a diagonal slit. In the fourth example of FIG. 16A as such, although the diagonal-slit-shaped pass-through region 53 is provided in each region corresponding to a stereoscopic pixel, such a one-to-one relationship is not necessarily restrictive.

In the fifth example of FIG. 16B, each scattering region 31 is provided therein with a plurality of pass-through regions 54 each shaped like an X-shaped slit. In the fifth example of FIG. 16B as such, although the X-shaped-slit pass-through region 54 is provided in each region corresponding to a stereoscopic pixel, such a one-to-one relationship is not necessarily restrictive.

In the sixth example of FIG. 16C, each scattering region 31 is provided with a plurality of pass-through regions 55 each slit-shaped in the X direction. In the sixth example of FIG. 16C as such, although the slit-shaped pass-through region 55 is provided in each region corresponding to a stereoscopic pixel, such a one-to-one relationship is not necessarily restrictive.

In the examples of FIGS. 11A to 16C as such, the pass-through region in the scattering region 31 preferably takes up 50% or less of the area of the scattering region 31, for example. If the pass-through region takes up more than 50% of the area of the scattering region 31, this may cause a disadvantage of reducing the display quality during 3D image display.

Effects

As described above, according to the display in the first embodiment, the second internal reflection face 3B of the light guiding plate 3 is provided with the scattering regions 31 and the total reflection regions 32 to allow both the first illumination light from the first light source 2 and the second illumination light L10 from the second light source 7 to be selectively emitted to the outside of the light guiding plate 3. As such, the light guiding plate 3 itself is provided with, equivalently, the functions as a parallax barrier. This favorably reduces the number of components compared with a previous stereoscopic display using the technology of parallax barrier, and reduces the space taken up thereby.

Moreover, according to the display in the first embodiment, the scattering regions 31 are each provided therein with the pass-through region to allow the second illumination light L10 from the second light source 7 to pass therethrough, thereby preventing any possible reduction of the light use efficiency of the second light source 7. This accordingly prevents any possible no-uniformity of the luminance distribution during 2D image display, and improves the display quality.

Second Embodiment

Described next is a display in a second embodiment of the present disclosure. Note that any component substantially similar to that in the display device in the first embodiment described above is provided with the same reference numeral, and is not described again if appropriate.

Entire Configuration of Display

In the first embodiment described above, exemplified is the configuration in which, in the light guiding plate 3, the scattering regions 31 and the total reflection regions 32 are provided on the second internal reflection face 3B side, but alternatively, may be provided on the first internal reflection face 3A side.

FIG. 17 shows an exemplary configuration of a display in the second embodiment of the present disclosure. Similarly to the display of FIG. 1, this display is capable of arbitrarily selectively making a mode change between the 2D display mode and the 3D display mode. FIG. 17 shows the configuration in the 3D display mode. FIG. 17 also schematically shows how rays of light are emitted from a light source device in the 3D display mode.

The second internal reflection face 3B is entirely mirror finished, thereby internally totally reflecting the first illumination light L1 coming at a light-incident angle θ1 satisfying the condition for total reflection. The first internal reflection face 3A is provided with the scattering regions 31 and the total reflection regions 32. In the first internal reflection face 3A, the total reflection regions 32 and the scattering regions 31 are provided alternately, e.g., like stripes, to be equivalent to the configuration of a parallax barrier. In other words, as will be described later, in the 3D display mode, the scattering regions 31 serve as the aperture sections (slit sections) of the parallax barrier, and the total reflection regions 32 serve as the light shielding sections thereof.

The total reflection regions 32 each serve to internally totally reflect the first illumination light L1 coming at the light-incident angle θ1 satisfying the condition for total reflection, i.e., internally totally reflect the first illumination light L1 coming at the light-incident angle θ1 larger than a predetermined critical angle cc. The scattering regions 31 each serve to emit, to the outside, at least a part of rays of light L2 coming at an angle corresponding to the light-incident angle θ1 satisfying the predetermined condition for total reflection on the total reflection regions 32, i.e., emit, to the outside, at least a part of rays of light coming at an angle corresponding to the light-incident angle θ1 larger than the predetermined critical angle α. Also on the scattering regions 31, a part of the remaining rays of light L12 is to be internally reflected.

In the display of FIG. 17, to perform spatial separation of a plurality of perspective images displayed on the display section 1, the pixel section of the display section 1 is expected to oppose to the scattering regions 31 of the light guiding plate 3 with a predetermined distance d therebetween. In FIG. 1, the display section 1 and the light guiding plate 3 are disposed with the spacer 8 therebetween. The spacer 8 may be made of a colorless and transparent material not causing light scattering that much, e.g., PMMA. This spacer 8 may be so provided as to entirely cover the surface on the rear surface side of the display section 1 and the surface of the light guiding plate 3, or to partially take up the least amount of space expected to keep the distance d.

Specific Exemplary Configuration of Scattering Region 31

FIG. 18A shows a first exemplary design of the surface of the light guiding plate 3. FIG. 18B schematically shows how rays of light are reflected and scattered on the surface of the light guiding plate 3 of FIG. 18A. With this first exemplary design, the scattering region 31 is shaped concave with respect to the total reflection region 32, i.e., concave-shaped scattering region 31A. To form such a concave shape, after minor-finishing the surface of the light guiding plate 3, any portion corresponding to the scattering region 31A is subjected to laser processing. With the concave-shaped scattering region 31A as such, rays of light coming at an angle corresponding to the light-incident angle θ1 satisfying the predetermined condition for total reflection on the total reflection region 32 at least partially fail to satisfy the condition for total reflection on the side surface portion 33 of the concave-shaped region, and thus are emitted to the outside.

FIG. 19A shows a second exemplary design of the surface of the light guiding plate 3. FIG. 19B schematically shows how rays of light are reflected and scattered on the surface of the light guiding plate 3 shown in FIG. 19A. With this second exemplary design, the scattering region 31 is shaped convex with respect to the total reflection region 32, i.e., convex-shaped scattering region 31B. Such a convex shape is formed by subjecting the surface of the light guiding plate 3 to molding. In this case, any portion corresponding to the total reflection region 32 is subjected to mirror processing by the surface of the mold. With the convex-shaped scattering region 31B as such, rays of light coming at an angle corresponding to the light-incident angle θ1 satisfying the predetermined condition for total reflection on the total reflection region 32 at least partially fail to satisfy the condition for total reflection on the side surface portion 34 of the convex-shaped region, and thus are emitted to the outside.

FIG. 20A shows a third exemplary design of the surface of the light guiding plate 3. FIG. 20B schematically shows how rays of light are reflected and scattered on the surface of the light guiding plate 3 shown in FIG. 20A. With the exemplary designs of FIGS. 18A and 19A, the scattering region 31 is formed by processing the surface of the light guiding plate 3 to be shaped differently from the total reflection region 32. On the other hand, the scattering region 31C in this exemplary configuration of FIG. 20A is not processed on the surface but the surface portion of the light guiding plate 3 corresponding to the first internal reflection face 3A is provided with the light scattering member 35. The light scattering member 35 is made of a material with a refractive index equal to or higher than that of the light guiding plate 3, e.g., PET (polyethylene terephthalate) resin with a refractive index of about 1.57. To form the scattering region 31C, a light scattering sheet made of PET resin is affixed to the surface of the light guiding plate 3 using an acrylic adhesive, for example. With the scattering region 31C provided with the light scattering member 35 as such, rays of light coming at an angle corresponding to the light-incident angle θ1 satisfying the predetermined condition for total reflection on the total reflection region 32 at least partially fail to satisfy the condition for total reflection due to a change of refractive index by the light scattering member 35, and thus are emitted to the outside.

The exemplary configurations described above are surely not restrictive, and any other exemplary configurations are possible for the scattering region 31. As an example, on the surface of the light guiding plate 3, any portion corresponding to the scattering region 31 may be subjected to sandblast processing or to coating, for example.

Basic Operation of Display

In this display, for display in the 3D display mode (FIGS. 18A and 18B), image display is made on the display section 1 based on 3D image data, and at the same time, the second light source 7 is put in the state of OFF (light-off state) over the screen. The first light source 2 disposed on the side surface of the light guiding plate 3 is put in the state of ON (light-on state). In this case, the first illumination light L1 coming from the first light source 2 is repeatedly internally totally reflected in the light guiding plate 3, i.e., between the total reflection regions 32 of the first internal reflection face 3A and the second internal reflection face 3B, so that the illumination light L1 is directed from one of the side surfaces where the first light source 2 is located to the other opposite side surface for emission therefrom. At the same time, as to the rays of light L2 entering the scattering regions 31 of the first internal reflection face 3A of the light guiding plate 3, a part thereof failing to satisfy the condition for total reflection is emitted to the outside from the scattering regions 31. Also on the scattering regions 31, a part of the remaining rays of light is internally reflected. Such rays of light are emitted to the outside via the second internal reflection face 3B of the light guiding plate 3, and do not contribute to the image display. As a result, from the first internal reflection face 3A of the light guiding plate 3, the rays of light are emitted only from the scattering regions 31. In other words, the surface of the light guiding plate 3 is functioned equivalently as a parallax barrier in which the scattering regions 31 serve as the aperture sections (slit sections), and the total reflection regions 32 serve as the light shielding sections. As such, equivalently, 3D display using the technology of parallax barrier is performed with a parallax barrier provided on the rear surface side of the display section 1.

On the other hand, for display in the 2D display mode, image display is made on the display section 1 based on 2D image data, and at the same time, the second light source 7 is put in the state of ON (light-on state) over the screen. The first light source 2 disposed on the side surface of the light guiding plate 3 is put in the light-off state, for example. In this state, the second illumination light L10 coming from the second light source 7 enters the light guiding plate 3 almost vertically via the second internal reflection face 3B. Therefore, the light-incident angle for the rays of light does not satisfy the condition for total reflection on the total reflection regions 32, and the rays of light are emitted not only from the scattering regions 31 but also from the total reflection regions 32. As a result, the rays of light are emitted entirely from the first internal reflection face 3A of the light guiding plate 3. In other words, the light guiding plate 3 is functioned as a flat light source similarly to any general backlight. As such, equivalently, 2D display using the technology of backlight is performed with a general backlight provided on the rear surface side of the display section 1.

Alternatively, for display in the 2D display mode, the first light source 2 disposed on the side surface of the light guiding plate 3 may be controlled also to be in the state of ON (light-on state) as is the second light source 7. Still alternatively, for display in the 2D display mode, the first light source 2 may be changed in state between light-off state and light-on as appropriate. If this is the case, for example, when turning ON only the second light source 7 causes a difference of luminance distribution between the scattering regions 31 and the total reflection regions 32, adjusting appropriately the state of illumination of the first light source 2, i.e., performing ON/OFF control or adjusting the level of illumination, may optimize the luminous distribution for the full screen.

Also in this second embodiment, similarly to the examples of FIGS. 11A to 16C, the scattering regions 31 are each provided therein with the pass-through region, thereby preventing any possible reduction of the light use efficiency of the second light source 7.

Effects

As described above, according to the display in the second embodiment, the first internal reflection face 3A of the light guiding plate 3 is provided with the scattering regions 31 and the total reflection regions 32 to allow the two types of light, i.e., the first illumination light from the first light source 2 and the second illumination light L10 from the second light source 7, to be selectively emitted to the outside of the light guiding plate 3. As such, the light guiding plate 3 itself is provided with, equivalently, the functions as a parallax barrier. This favorably reduces the number of components compared with a previous stereoscopic display using the technology of parallax barrier, and reduces the space taken up thereby.

Moreover, similarly to the display in the first embodiment described above, with the scattering regions 31 each provided therein with the pass-through region, thereby preventing any possible reduction of the light use efficiency of the second light source 7. This accordingly prevents any possible no-uniformity of the luminance distribution during 2D image display, and improves the display quality.

Other Embodiments

While the present disclosure has been described in detail by referring to the embodiments, the present disclosure is not restrictive to the embodiments described above, and it is understood that numerous other modifications may be possibly devised.

For example, in the embodiments described above, exemplified is the configuration of the light guiding plate 3 including the scattering regions 31 and the total reflection regions 32 only either on the first or second internal reflection face 3A or 3B. As an alternative configuration, the scattering regions 31 and the total reflection regions 32 may be provided to both the first and second internal reflection faces 3A and 3B.

The present disclosure is also possibly in the following configurations.

(1) A light source device, including:
a light guide plate having a first internal reflection face and a second internal reflection face which face each other, and having one or more side faces;
one or more first light sources applying first illumination light through the side faces of the light guide plate into the light guide plate; and
a second light source disposed to face a surface, of the light guide plate, corresponding to the second internal reflection face, the second light source externally applying second illumination light to the second internal reflection face,
wherein one or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

(2) The light source device according to (1), wherein the plurality of light scattering regions are provided to extend in a first direction in the first or second internal reflection face, and are arranged side by side in a second direction.

(3) The light source device according to (2), wherein the pass-through regions are each slit-shaped to extend in the first direction.

(4) The light source device according to (2), wherein the pass-through regions are each slit-shaped to extend in the second direction.

(5) The light source device according to (2), wherein the pass-through regions are each slit-shaped to extend in an oblique direction with respect to the first direction.

(6) The light source device according to any one of (1) to (5), wherein each of the light scattering regions are provided with a plurality of pass-through regions.

(7) The light source device according to any one of (1) to (6), wherein the pass-through regions occupies, in area, 50% or less of each of the scattering regions.

(8) A display including:
a display section performing image display; and
a light source device emitting light for image display toward the display section, the light source device including a light guide plate having a first internal reflection face and a second internal reflection face which face each other, and having one or more side faces;

one or more first light sources applying first illumination light through the side faces of the light guide plate into the light guide plate; and a second light source disposed to face a surface, of the light guide plate, corresponding to the second internal reflection face, the second light source externally applying second illumination light to the second internal reflection face, wherein one or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

(9) The display according to (8), wherein the display section is configured to selectively switch images to be displayed between a plurality of perspective images based on three-dimensional image data and an image based on two-dimensional image data, and the second light source is controlled to stay in a light-off state when the plurality of perspective images are displayed on the display section, and controlled to stay in a light-on state when the image based on the two-dimensional image data is displayed on the display section.

(10) The display according to (9), wherein the first light source is controlled to stay in a light-on state when the plurality of perspective images are displayed on the display section, and controlled to stay in either a light-off state or the light-on state when the image based on the two-dimensional image data is displayed on the display section.

(11) A display including:

a display section; and a light source device including a light guiding plate, one or more first light sources, and a second light source, the light guiding plate having a first face and a second face which face each other and having one or more side faces, the first light sources being disposed to face the respective side faces of the light guide plate, the second light source being disposed to face a surface, of the light guide plate, corresponding to the second face, the second light source being controlled to stay in a light-off state when the display section is in a 3D mode, and controlled to stay in a light-on state when the display section is in a 2D mode, wherein one or both of the first and second faces each have a plurality of scattering regions, each of the scattering regions being provided with one or more pass-through regions each allowing light from the second light source to pass therethrough.

The present disclosure contains subject matter related to that disclosed in Japanese Priority Patent Application JP 2011-084732 filed in the Japan Patent Office on Apr. 6, 2011, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A light source device, comprising:

a light guide plate having a first internal reflection face and a second internal reflection face which face each other, and having one or more side faces;

one or more first light sources applying first illumination light through the side faces of the light guide plate into the light guide plate; and a second light source disposed to face a surface, of the light guide plate, corresponding to the second internal reflection face, the second light source externally applying second illumination light to the second internal reflection face, wherein one or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

2. The light source device according to claim 1, wherein the plurality of light scattering regions are provided to extend in a first direction in the first or second internal reflection face, and are arranged side by side in a second direction.

3. The light source device according to claim 2, wherein the pass-through regions are each slit-shaped to extend in the first direction.

4. The light source device according to claim 2, wherein the pass-through regions are each slit-shaped to extend in the second direction.

5. The light source device according to claim 2, wherein the pass-through regions are each slit-shaped to extend in an oblique direction with respect to the first direction.

6. The light source device according to claim 1, wherein each of the light scattering regions are provided with a plurality of pass-through regions.

7. The light source device according to claim 1, wherein the pass-through regions occupies, in area, 50% or less of each of the scattering regions.

8. A display comprising:

a display section performing image display; and a light source device emitting light for image display toward the display section, the light source device including a light guide plate having a first internal reflection face and a second internal reflection face which face each other, and having one or more side faces;

one or more first light sources applying first illumination light through the side faces of the light guide plate into the light guide plate; and a second light source disposed to face a surface, of the light guide plate, corresponding to the second internal reflection face, the second light source externally applying second illumination light to the second internal reflection face, wherein one or both of the first and second internal reflection faces each have a plurality of scattering regions allowing the first illumination light from the first light source to be scattered and to exit from the first internal reflection face to outside of the light guide plate, each of the scattering regions being provided with one or more pass-through regions each allowing the second illumination light from the second light source to pass therethrough.

9. The display according to claim 8, wherein the display section is configured to selectively switch images to be displayed between a plurality of perspective images based on three-dimensional image data and an image based on two-dimensional image data, and the second light source is controlled to stay in a light-off state when the plurality of perspective images are displayed on the display section, and controlled to stay in a light-on state when the image based on the two-dimensional image data is displayed on the display section.

10. The display according to claim 9, wherein the first light source is controlled to stay in a light-on state when the plurality of perspective images are displayed on the display section, and controlled to stay in either a light-off state or the light-on state when the image based on the two-dimensional image data is displayed on the display section.

11. A display comprising:

a display section; and a light source device including a light guiding plate, one or more first light sources, and a second light source, the light guiding plate having a first face and a second face which face each other and having one or more side faces, the first light sources being disposed to face the respective side faces of the light guide plate, the second light source being disposed to face a surface, of the light guide plate, corresponding to the second face, the second light source being controlled to stay in a light-off state when the display section is in a 3D mode, and controlled to stay in a light-on state when the display section is in a 2D mode, wherein one or both of the first and second faces each have a plurality of scattering regions, each of the scattering regions being provided with one or more pass-through regions each allowing light from the second light source to pass therethrough.

* * * * *